(12) United States Patent
Mizutani et al.

(10) Patent No.: US 9,455,607 B2
(45) Date of Patent: Sep. 27, 2016

(54) CLUTCH AND MOTOR

(75) Inventors: Nobuo Mizutani, Toyohashi (JP); Tomoki Yamashita, Hamamatsu (JP)

(73) Assignee: ASMO CO., LTD., Shizuoka-ken (JP)

( * ) Notice: Subject to any disclaimer, the term of this patent is extended or adjusted under 35 U.S.C. 154(b) by 1192 days.

(21) Appl. No.: 13/379,935

(22) PCT Filed: Jun. 22, 2010

(86) PCT No.: PCT/JP2010/060532
§ 371 (c)(1),
(2), (4) Date: Dec. 21, 2011

(87) PCT Pub. No.: WO2010/150771
PCT Pub. Date: Dec. 29, 2010

(65) Prior Publication Data
US 2012/0098367 A1     Apr. 26, 2012

(30) Foreign Application Priority Data

Jun. 23, 2009 (JP) ................ 2009-148937
Dec. 16, 2009 (JP) ................ 2009-285246

(51) Int. Cl.
*F16D 51/12*    (2006.01)
*H02K 7/102*    (2006.01)
(Continued)

(52) U.S. Cl.
CPC ............ *H02K 7/108* (2013.01); *F16D 41/063* (2013.01); *F16D 41/10* (2013.01); *F16D 43/02* (2013.01); *F16D 51/12* (2013.01); *H02K 7/102* (2013.01); *E05F 11/505* (2013.01); *E05Y 2900/55* (2013.01); *H02K 7/1166* (2013.01)

(58) Field of Classification Search
CPC ...................................... F16D 51/12
USPC ........................................ 192/223
See application file for complete search history.

(56) References Cited

U.S. PATENT DOCUMENTS 3,051,282 A * 8/1962 Greene ................ 192/223
3,335,831 A * 8/1967 Kalns ................. 192/223
(Continued)

FOREIGN PATENT DOCUMENTS

JP    01-317408 A    12/1989
JP    2001-289265 A    10/2001
(Continued)

OTHER PUBLICATIONS

International Search Report (Form PCT/ISA/210) for PCT/US2005/003808.

*Primary Examiner* — Terry Chau
(74) *Attorney, Agent, or Firm* — Marsh Fischmann & Breyfogle LLP

(57) ABSTRACT

A clutch including a drive shaft, drive side rotation body, driven shaft, driven side rotation body, clutch housing, and lock member is disclosed. During non-rotation of the drive side rotation body, when the driven side rotation body is rotated, the lock member is pushed by the driven side rotation body and moved outward in a radial direction thereby bringing the contact portion into contact with the inner circumferential surface of the clutch housing. During rotation of the drive side rotation body, the drive side rotation body pushes a drive side cam surface in the rotation direction, and the drive side cam surface acts to move the lock member inward in the radial direction and push the lock member against the driven side rotation body. Thus, the lock member is sandwiched between the drive side rotation body and the driven side rotation body thereby coupling the drive side rotation body and the driven side rotation body with the lock member to be integrally rotatable.

20 Claims, 11 Drawing Sheets

(51) Int. Cl.
*H02K 7/116* (2006.01)
*H02K 7/108* (2006.01)
*F16D 43/02* (2006.01)
*F16D 41/063* (2006.01)
*F16D 41/10* (2006.01)
*E05F 11/50* (2006.01)

(56) References Cited

U.S. PATENT DOCUMENTS

| | | | |
|---|---|---|---|
| 3,587,796 A * | 6/1971 | Nestvogel | 192/223 |
| 3,603,577 A * | 9/1971 | DeRaad | 267/151 |
| 4,591,029 A | 5/1986 | Da Foe | |
| 6,257,388 B1 * | 7/2001 | Cronin | F16D 41/10 188/134 |
| 6,288,464 B1 * | 9/2001 | Torii et al. | 310/78 |
| 2005/0189189 A1 | 9/2005 | Acosta | |
| 2006/0175175 A1 * | 8/2006 | Acosta | 192/223 |

FOREIGN PATENT DOCUMENTS

| | | |
|---|---|---|
| JP | 2003-278784 A | 10/2003 |
| JP | 2007-525628 A | 9/2007 |
| WO | 2005-093276 A1 | 10/2005 |

* cited by examiner

CLUTCH AND MOTOR

TECHNICAL FIELD

The present invention relates to a clutch that functions to transmit rotational drive force from a drive shaft to a driven shaft without transmitting rotational force from the driven shaft to the drive shaft and to a motor in which a drive shaft of a motor unit and a deceleration mechanism of a deceleration unit are coupled by the clutch.

BACKGROUND ART

A motor used for a drive source of a power window device or the like includes a motor unit, which generates rotational drive force that rotates a rotation shaft (drive shaft), and a deceleration unit, which decelerates the rotation speed of the rotation shaft and outputs the rotational drive force from an output shaft coupled to a load. The rotation shaft arranged in the motor unit and a worm shaft (output shaft) of the deceleration mechanism arranged in the deceleration unit are coupled by a clutch, which functions to transmit the rotational drive force from the rotation shaft to the worm shaft without transmitting rotational force from the worm shaft to the rotation shaft.

For instance, in a motor described in patent document 1, a mechanical clutch couples the rotation shaft and the worm shaft. The clutch includes a drive side rotation body, which is rotated integrally with the rotation shaft, a driven side rotation body, which is rotated integrally with the worm shaft, and a plurality of components coupling the drive side rotation body and the driven side rotation body.

The drive side rotation body and the driven side rotation body are arranged to axially face each other inside a cylindrical collar. A ball, which receives a thrust load, is arranged between the rotation shaft and the driven side rotation body. Three cylindrical rolling elements extending in the axial direction are arranged at equal angular intervals in the circumferential direction between an inner circumferential wall of the collar and an outer circumferential wall of the driven side rotation body. The rolling elements are supported by a support member. The support member supports the rolling elements so as to face the drive side rotation body in the circumferential direction inside the collar. Further, the collar and the support member are fixed to a gear housing that accommodates the deceleration mechanism with a stopper formed by a metal plate.

When the motor unit is driven and the rotation shaft is rotated, the drive side rotation body and the driven side rotation body are engaged in the rotation direction and rotate integrally. Thus, the rotational drive force of the rotation shaft is transmitted to the worm shaft by the drive side rotation body and the driven side rotation body, decelerated by the deceleration mechanism, and then output. In this case, the support member also engages the drive side rotation body in the rotation direction. Thus, the support member rotates integrally with the drive side rotation body along with the three rolling elements. If the rotational force is applied to the worm shaft when the motor unit is stopped, the rolling elements are sandwiched between the driven side rotation body and the collar thus inhibiting the rotation of the driven side rotation body. This inhibits transmission of the rotational force of the worm shaft to the rotation shaft.

PRIOR ART DOCUMENTS

Patent Documents

Patent document 1: Japanese Laid-Open Patent Publication No. 2003-278784

SUMMARY OF THE INVENTION

Problems that are to be Solved by the Invention

The clutch described in patent document 1, however, includes the drive side rotation body, the driven side rotation body, the collar, the ball, the three rolling elements, the support member, and the stopper. Thus, the clutch has a large number of components and has a complex mechanism. As a result, facilities for manufacturing the large each of components are necessary, the coupling of such component is burdensome thereby lengthening the time for coupling processes, and the manufacturing cost consequently becomes high.

It is an object of the present invention to provide a mechanical clutch with a simplified mechanism and a motor including such a clutch.

To achieve the above object, the present invention provides a clutch including a drive shaft, a drive side rotation body, which is integrally rotatable with the drive shaft, a driven shaft, which is arranged coaxially with the drive shaft, a driven side rotation body, which is integrally rotatable with the driven shaft, a clutch housing, in which the drive side rotation body and the driven side rotation body can be arranged, and a lock member, which is arranged between the drive side rotation body and the driven side rotation body inside the clutch housing. The lock member includes a contact portion, which contacts with and separates from an inner circumferential surface of the clutch housing, and a drive side cam surface with which the drive side rotation body comes into contact from a rotation direction. During non-rotation of the drive side rotation body, when the driven side rotation body is rotated, the lock member is pushed by the driven side rotation body and moved outward in a radial direction thereby bringing the contact portion into contact with the inner circumferential surface of the clutch housing such that the lock member is sandwiched between the clutch housing and the driven side rotation body and inhibits further rotation of the driven side rotation body. During rotation of the drive side rotation body, the drive side rotation body pushes the drive side cam surface in the rotation direction, and the drive side cam surface acts to move the lock member inward in the radial direction and push the lock member against the driven side rotation body so that the lock member is sandwiched between the drive side rotation body and the driven side rotation body thereby coupling the drive side rotation body and the driven side rotation body with the lock member to be integrally rotatable.

During rotation of the drive side rotation body, the drive side rotation body presses the drive side cam surface in the rotation direction, and the drive side cam surface acts to move the lock member inward in the radial direction and push the lock member against the drive side rotation body. As a result, the lock member is sandwiched between the drive side rotation body and the driven side rotation body to couple the drive side rotation body and the driven side rotation body to be integrally rotatable.

DETAILED DESCRIPTION OF THE PREFERRED EMBODIMENTS

A first embodiment of the present invention will now be described with reference to the drawings.

Figure 1:
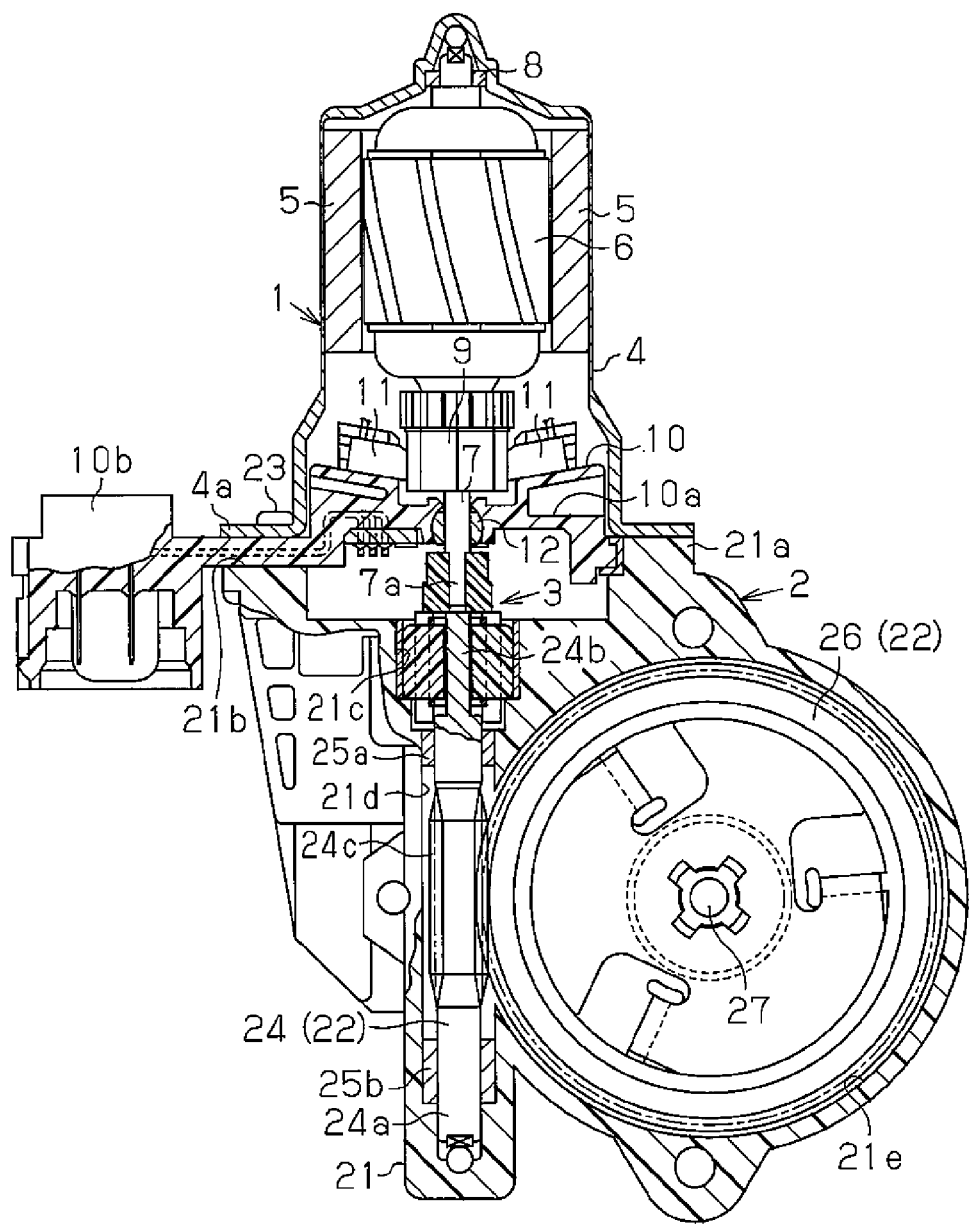
FIG. 1 is a partial cross-sectional view of a motor according to the present invention.

FIG. 1 is a partial cross-sectional view of a motor of the present embodiment used as a drive source for a power window device. The motor includes a motor unit 1, a deceleration unit 2, and a clutch 3.

The motor unit 1 has a yoke housing 4, which is tubular and has a closed bottom. A pair of magnets 5 is fixed to the inner circumferential surface of the yoke housing 4 so as to face each other. An armature 6 is arranged on an inner side in a radial direction of the magnet 5 inside the yoke housing 4. The armature 6 includes a rotation shaft 7, that is, a drive shaft extending along an axial direction at the middle in the radial direction of the yoke housing 4. A bearing 8 is arranged at the middle of the bottom of the yoke housing 4. The bearing 8 rotatably supports a basal end of the rotation shaft 7. A cylindrical commutator 9 is fixed to a portion of the rotation shaft 7 closer to a distal end. A coupling portion 7a having a pair of flat surfaces extending parallel to each other is formed at the outer circumferential part of the distal end of the rotation shaft 7.

A flange portion 4a extending outward in the radial direction is formed in the opening of the yoke housing 4, and a brush holder 10 is fitted to the opening of the yoke housing 4. The brush holder 10 is configured by integrally forming a holder main body 10a formed to close the opening of the yoke housing 4, and a connector 10b projecting outward in the radial direction of the yoke housing 4. The holder main body 10a is connected to the connector 10b with a wiring. The holder main body 10a holds a pair of brushes 11 that slidably contact the commutator 9. A bearing 12 is arranged at the middle of the holder main body 10a. The bearing 12 rotatably supports a portion between the commutator 9 and the coupling portion 7a on the rotation shaft 7. An external power supply supplied to the brush 11 through the connector 10b is supplied to a coil winding of the armature 6 through the commutator 9. This rotates the armature 6 (rotation shaft 7), that is, drives the motor unit 1.

The deceleration unit 2 includes a gear housing 21 and a deceleration mechanism 22, which is accommodated in the gear housing 21. The gear housing 21 is formed from resin and includes a fixing portion 21a for fixing the gear housing 21 to the motor unit 1 at a portion (end on upper side in FIG. 1) axially facing the motor unit 1. The fixing portion 21a has an outer shape similar to the outer shape of the flange portion 4a of the yoke housing 4. A fitting recess 21b opened towards the interior of the yoke housing 4 is formed in the fixing portion 21a. The fixing portion 21a and the flange portion 4a are coupled with a screw 23 with the holder main body 10a of the brush holder 10 fitted to the fitting recess 21b so that the gear housing 21 and the yoke 4 are coupled and the motor unit 1 and the deceleration unit 2 are integrated.

The gear housing 21 includes a clutch accommodation recess 21c, which extends in the axial direction of the rotation shaft 7 at the middle of the bottom of the fitting recess 21b, and a worm shaft accommodation portion 21d, which extends in an axis direction of the rotation shaft 7 from the middle of the bottom of the clutch accommodation recess 21c. The gear housing 21 also includes a wheel accommodation portion 21e at the side of the worm shaft accommodation portion 21d. The wheel accommodation portion 21e and the worm shaft accommodation portion 21d are connected at the central part in the axial direction (longitudinal direction) of the worm shaft accommodation portion 21d.

Figure 2:
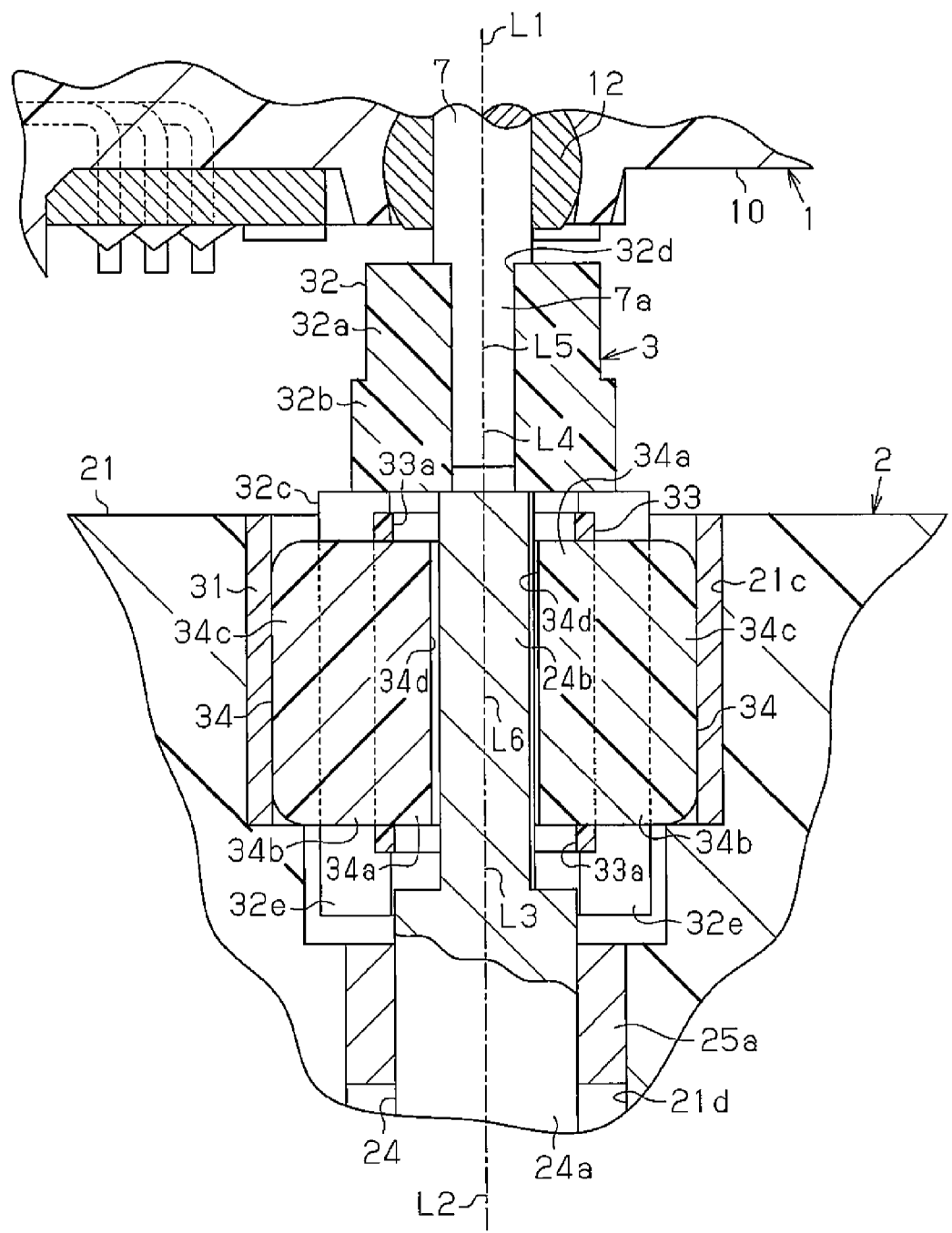
FIG. 2 is a partially enlarged cross-sectional view of the motor of FIG. 1.

The worm shaft accommodation portion 21d accommodates a substantially circular column shaped worm shaft 24. The worm shaft 24 is made from a metal material, and includes a substantially circular column shaped worm shaft main body 24a, and a driven side rotation body 24b integrally formed at the basal end of the worm shaft main body 24a (i.e., end on motor unit 1 side, end being on upper side in FIG. 1). A screw teeth portion 24c is formed at the central part in the axial direction of the worm shaft main body 24a. Both axial ends of the worm shaft main body 24a are rotatably supported by a pair of metal bearings 25a, 25b having a cylindrical shape arranged at both ends in the axial direction of the worm shaft accommodation portion 21d. As shown in FIG. 2, the worm shaft main body 24a in the worm shaft accommodation portion 21d is arranged so as to be coaxial with the rotation shaft 7, that is, so that a center axis L1 of the rotation shaft 7 and a center axis L2 of the worm shaft main body 24a extend along a straight line.

Figure 4:
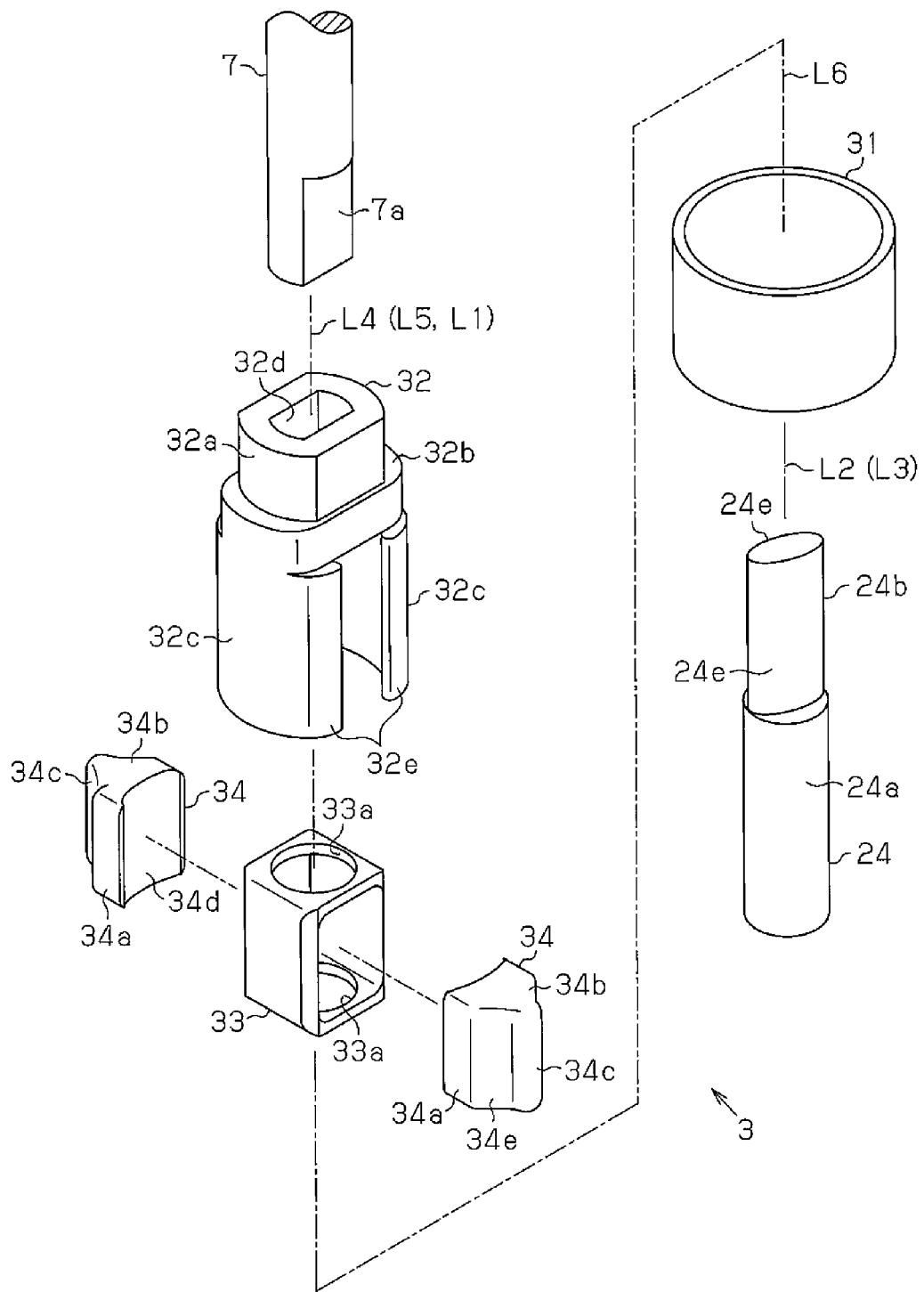
FIG. 4 is an exploded perspective view of a clutch according to a first embodiment of the present invention.

The driven side rotation body 24b extends along the axial direction from the basal end face of the worm shaft main body 24a. As shown in FIG. 4, the cross-section of the driven side rotation body 24b orthogonal to the axial direction has an elliptical shape and is rod-shape as a whole. To facilitate description, the arcuate side surface that intersects the minor axis in the elliptical shape of the driven side rotation body 24b is indicated by reference character "24e". As shown in FIG. 2, a center axis L3 of the driven side rotation body 24b conforms to the center axis L2 of the worm shaft main body 24a. The driven side rotation body 24b projects out of the worm shaft accommodation portion 21d into the clutch accommodation recess 21c.

A worm wheel 26, which has the shape of a circular plate and is engaged with the screw teeth portion 24c of the worm shaft 24, is accommodated in the wheel accommodation portion 21e. The worm wheel 26 configures the deceleration mechanism 22 with the worm shaft 24. The worm wheel 26 is rotatable about an axis extending in a direction (direction perpendicular to plane of drawing in FIG. 1) orthogonal to the center axis of the worm shaft main body 24a at the central part in the radial direction and includes an output shaft 27 that rotates integrally with the worm wheel at the central part in the radial direction. A known window regulator (not shown) for raising and lowering the window glass of a vehicle is drive coupled to the output shaft 27.

Figure 3:
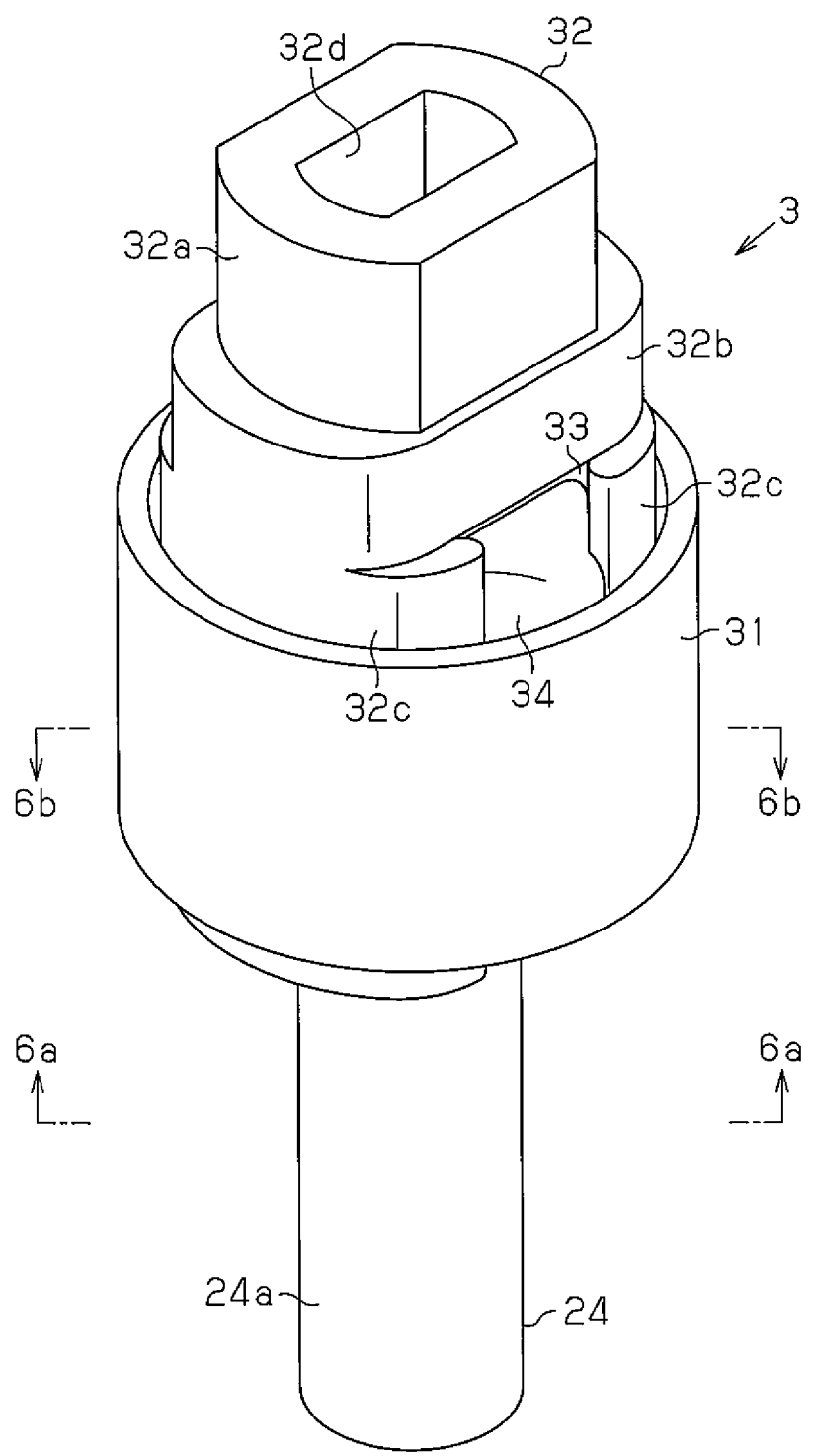
FIG. 3 is a perspective view of a clutch arranged in the motor of FIG. 1.

The clutch accommodation recess 21c has a circular shape as viewed from the axial direction of the worm shaft 24 and accommodates the clutch 3, which couples the rotation shaft 7 and the worm shaft 24. As shown in FIGS. 3 and 4, the clutch 3 includes a clutch housing 31, a drive side rotation body 32, a support member 33, a pair of lock members 34, and the driven side rotation body 24b.

The clutch housing 31 is formed from metal and has a cylindrical shape. As shown in FIG. 2, the outer diameter of the clutch housing 31 is formed to be substantially equal to the inner diameter of the clutch accommodation recess 21c, and the axial length of the clutch housing 31 is formed to be substantially equal to the depth of the clutch accommodation recess 21c. The clutch housing 31 is accommodated in the clutch accommodation recess 21c in a state in which the outer circumferential surface of the clutch housing 31 contacting the inner circumferential surface of the clutch accommodation recess 21c is non-pivotal relative to the gear housing 21.

As shown in FIGS. 3 and 4, the drive side rotation body 32, which is arranged in the clutch housing 31, is formed from resin. Further, the drive side rotation body 32 is formed integrally with a drive coupling portion 32a, to which the coupling portion 7a of the rotation shaft 7 is coupled, a support portion 32b, and a pair of drive transmission portions 32c.

Figure 5A:
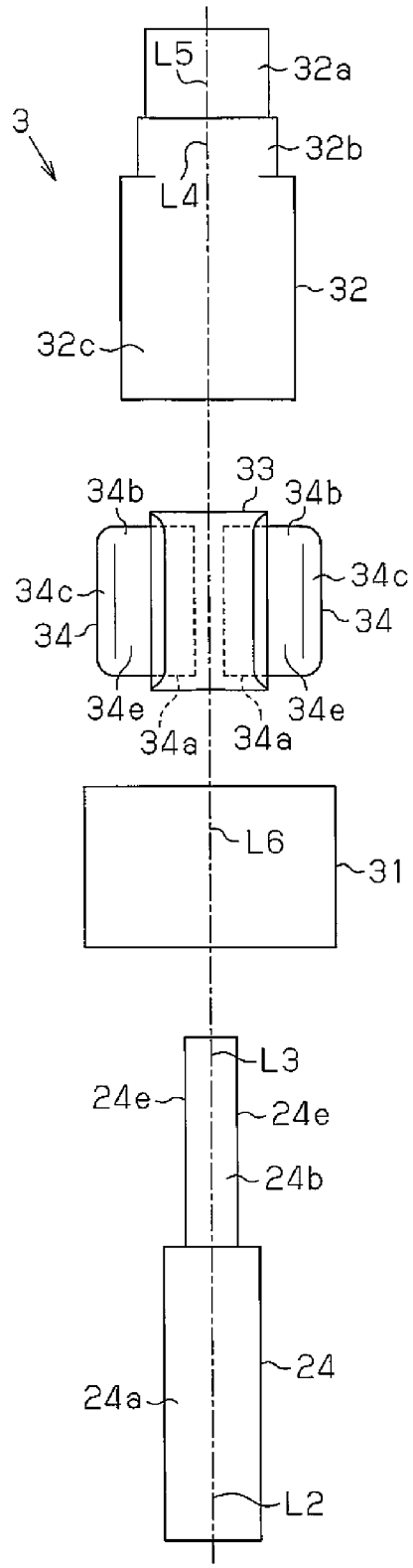
FIGS. 5(a) and 5(b) are exploded side views of the clutch of FIG. 4.
Figure 5B:
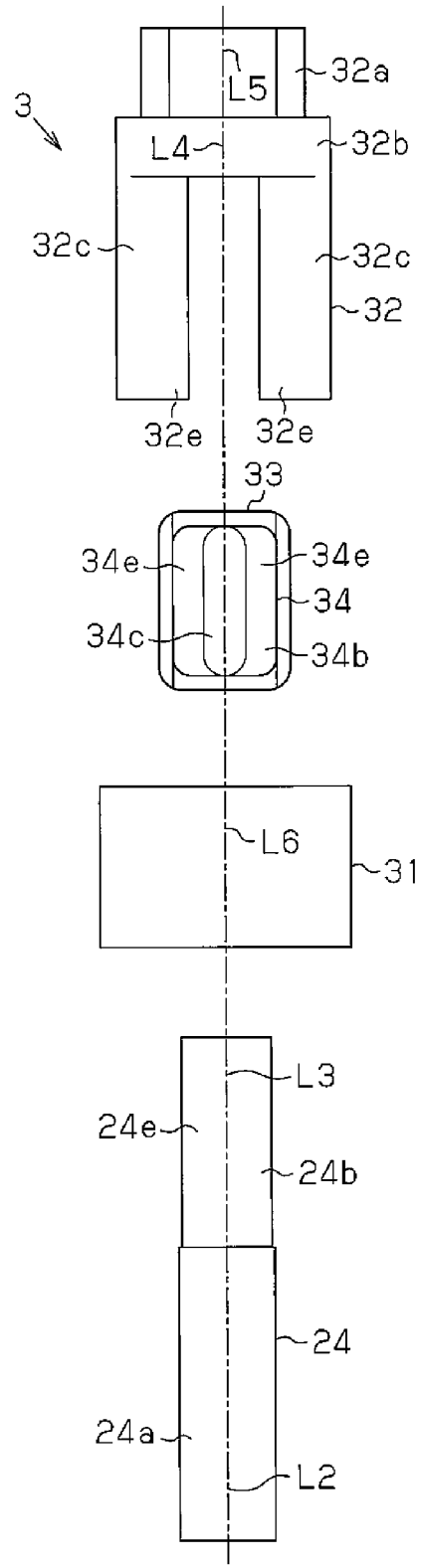

The drive coupling portion 32a has a pair of flat surfaces extending parallel to each other at its outer part. The support portion 32b is integrally formed at one axial end (end on lower side in FIG. 4) of the drive coupling portion 32a. The support portion 32b has a pair of flat surfaces extending parallel to each other at its outer part. That is, the outer peripheral shape of the support portion 32b is the same as the drive coupling portion 32a but is slightly larger in the radial direction than the drive coupling portion 32a. As shown in FIGS. 5(a) and 5(b), a center axis L4 of the support portion 32b conforms to a center axis L5 of the drive coupling portion 32a. The maximum dimension in the direction orthogonal to the center axis L4 in the support portion 32b is slightly smaller than the inner diameter of the clutch housing 31. As shown in FIG. 4, a coupling hole 32d that extends through the drive coupling portion 32a and the support portion 32b in the direction of the center axes L4, L5 is formed at the corresponding central part in the radial direction of the drive coupling portion 32a and the support portion 32b. The coupling hole 32d is a hole having a shape corresponding to the coupling portion 7a arranged at the distal end of the rotation shaft 7. The coupling portion 7a is inserted into the coupling hole 32d so that the rotation shaft 7 and the drive side rotation body 32 are engaged in the rotation direction to be integrally rotatable with each other.

The pair of drive transmission portions 32c extends along the axial direction from the axial end face of the support portion 32b. The end face (end face on lower side in FIG. 4) is located on the opposite side of the drive coupling portion 32a. The pair of drive transmission portions 32c extends to the opposite side of the drive coupling portion 32a along the axial direction from two sides of the support portion 32b. In other words, the pair of drive transmission portions 32c extends to the opposite side of the drive coupling portion 32a along the axial direction from two areas at equal angular intervals in the circumferential direction of the support portion 32b. As shown in FIG. 3, the length from the basal end to the distal end of the drive transmission portion 32c is formed to be greater than the axial length of the clutch housing 31. Further, as shown in FIG. 5(b), the drive transmission portions 32c in each pair are spaced apart from each other in a direction orthogonal to the center axis L4. As shown in FIG. 3, the pair of drive transmission portions 32c is inserted into the clutch housing 31.

Figure 6A:
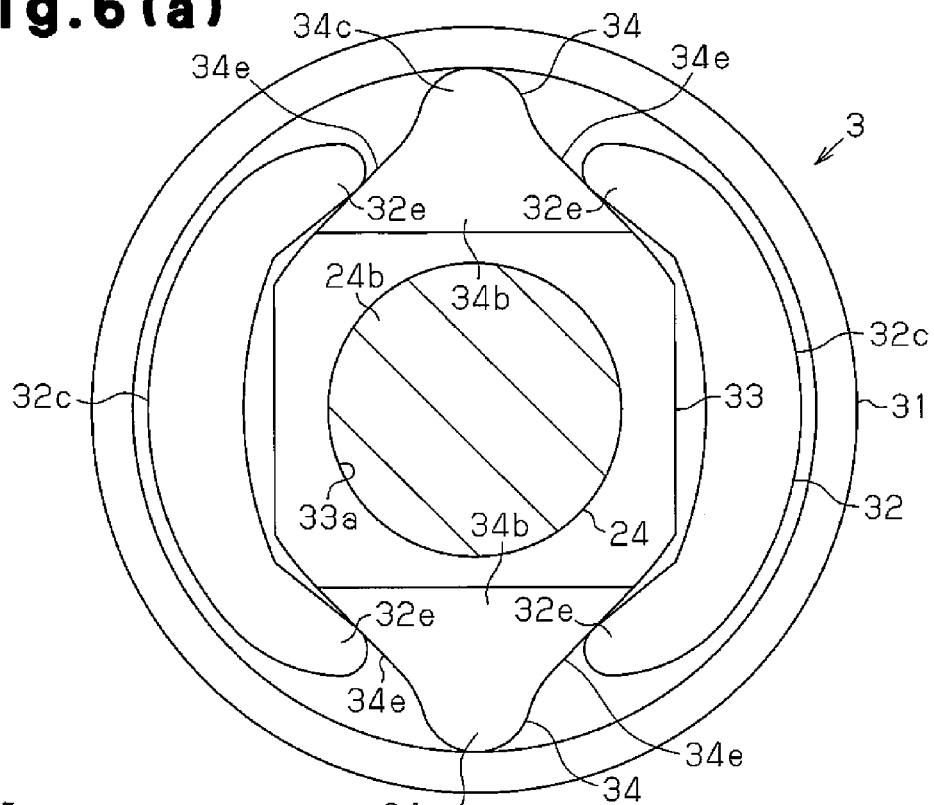
FIG. 6(a) is a cross-sectional view of the clutch when the motor is stopped (cross-sectional view taken along line 6a-6a in FIG. 3) in the first embodiment.
Figure 6B:
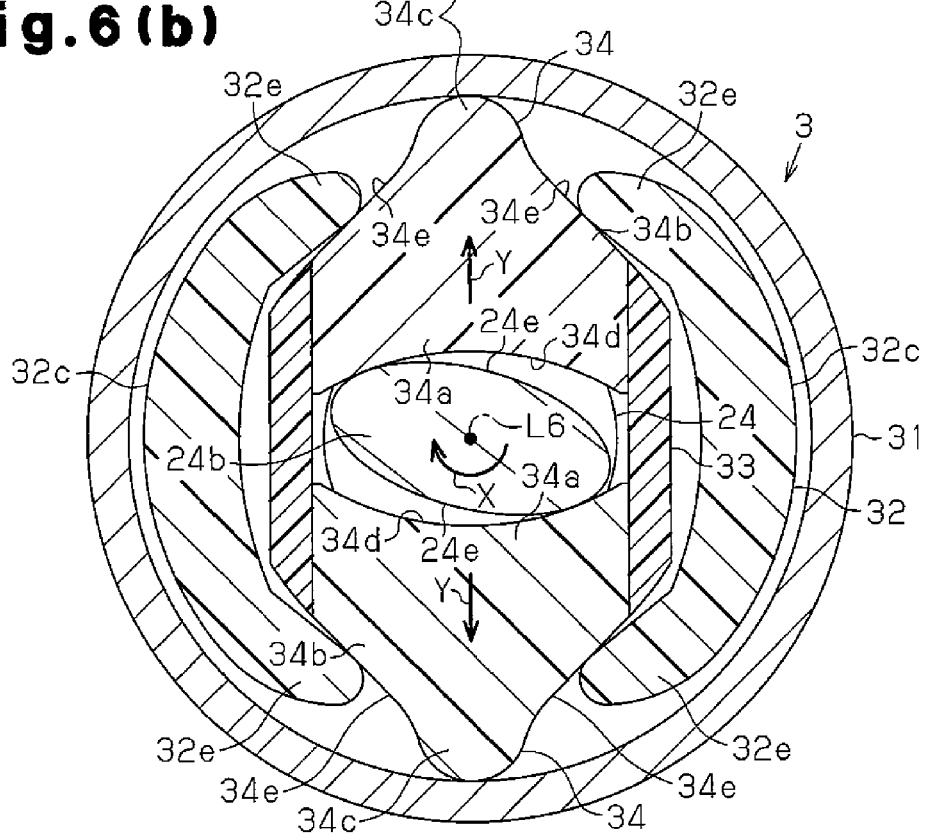
FIG. 6(b) is a cross-sectional view of the clutch when the motor is stopped (cross-sectional view taken along line 6b-6b in FIG. 3) in the first embodiment.

As shown in FIGS. 6(a) and 6(b), each drive transmission portion 32c, which has an arcuate shape and extends along the inner circumferential surface of the clutch housing 31, includes a pair of transmission parts 32e having a shape slightly bent towards the inner side in the radial direction at both circumferential ends. Each transmission part 32e is inclined toward the radially central part of the clutch housing 31 as the circumferentially central part of the drive transmission portion 32c becomes farther.

A pair of lock members 34, which is supported to be movable in a radial direction (radial direction of rotation shaft 7 that is also the radial direction of the clutch housing 31) by the support member 33, is arranged between the pair of drive transmission portions 32c.

The support member 33, which is arranged in the clutch housing 31, is formed from a resin material and has the shape of a hollow box. The support member 33 has a hole extending along the radial direction of the clutch housing 31. The two ends of the hole form a pair of openings that open in opposite directions. The length between the openings (i.e., length of the hole in the radial direction of the clutch housing 31) is less than the length between the distal ends of the pair of transmission parts 32e in each drive transmission portion 32c (i.e., length between the circumferential ends of the drive transmission portion 32c) and greater than the length between basal ends of the pair of transmission parts 32e in each drive transmission portion 32c. As shown in FIG. 6(a), when viewing the support member 33 from the axial direction of the clutch housing 31, the four corners of the support member 33 are chamfered. As shown in FIG. 4, the support member 33 has a pair of end walls facing each other in the axial direction of the rotation shaft 7. A circular through-hole 33a is formed in each end wall. The inner diameter of the through-hole 33a is slightly greater than the diameter of the worm shaft main body 24a excluding a part corresponding to the screw teeth portion 24c.

As shown in FIGS. 4 and 6(b), the pair of lock members 34 have the same shape and size and are symmetrically arranged with respect to a center axis L6 of the clutch housing 31 inside the clutch housing 31. The length along the diameter direction of the clutch housing 31 in each lock member 34 is less than one half of the inner diameter of the clutch housing 31. Each lock member 34, which is formed from a resin material, includes a pushing portion 34a, which is generally rectangular block-shaped, an intermediate transmission portion 34b, which is formed integrally with the radially outer side of the pushing portion 34a, and a contact portion 34c, which is formed integrally with the radially outer side of the intermediate transmission portion 34b.

In each lock member 34, the pushing portion 34a, which has an outer shape of a generally square plate corresponding to the inner circumferential surface of the support member 33, is arranged in the support member 33 in a state in which the outer circumferential surface is in contact in a movable manner with the inner circumferential surface of the support member 33. A driven side cam surface 34*d* recessed towards the contact portion 34*c* is arranged on the side surface on the side opposite to the contact portion 34*c* in the pushing portion 34*a*. The side surface is located closer to the center axis L6 (i.e., inner circumference side) of the clutch housing 31. The driven side cam surface 34*d* extends from one end to the other end of the pushing portion 34*a* along the axial direction. Each driven side cam surface 34*d* is symmetric with respect to a hypothetical plane (not shown) extending through the circumferential middle part of the pushing portion 34*a* in the radial direction. The curvature of the driven side cam surface 34*d* is smaller than the curvature of the pair of arcuate side surfaces 24*e* in the driven side rotation body 24*b* and thus forms a gradual arcuate shape.

The intermediate transmission portion 34*b* is formed integrally with the end opposite to the driven side cam surface 34*d*, that is, the end at the outer circumferential side in each pushing portion 34*a*. The intermediate transmission portion 34*b* is formed such that the width in the circumferential direction gradually becomes smaller from the basal end, which is closer to the pushing portion 34*a*, towards the distal end, which is closer to the outer circumference. In the intermediate transmission portion 34*b*, the cross-sectional shape taken along the direction orthogonal to the axial direction has a trapezoidal shape. A pair of drive side cam surfaces 34*e* inclined relative to the radial direction (radial direction of rotation shaft 7, and same in radial direction of clutch housing 31) is formed at both circumferential ends of each intermediate transmission portion 34*b*. The pair of drive side cam surfaces 34*e* is symmetric with respect to a hypothetical plane (not shown) extending through the middle in the circumferential direction of the contact portion 34*c* and in the radial direction. Further, the drive side cam surfaces 34*e* are extended to become closer to each other outward in the radial direction. Each drive side cam surface 34*e* extends from one end to the other end of the intermediate transmission portion 34*b* along the axial direction. The lock member 34, which includes the drive side cam surfaces 34*e*, and the drive side rotation body 32 (drive transmission portion 32*c*) configure the drive side cam mechanism.

Each contact portion 34*c*, which extends straight from one end to the other end of the intermediate transmission portion 34*b* along the axial direction, forms a protrusion extending outward in the radial direction. Each intermediate transmission portion 34*b* has a semicircular cross-sectional shape in a direction that is orthogonal to the axial direction.

As shown in FIGS. 2 and 6(*b*), the pair of lock members 34 is arranged in the clutch housing 31 between the pair of drive transmission portions 32*c* of the drive side rotation body 32. More specifically, the pair of lock members 34 are inserted into the support member 33 from a pair of openings of the support member 33, respectively, so that the driven side cam surfaces 34*d* face toward each other. The support member 33, in which the pair of lock members 34 are inserted, is arranged between the drive transmission portions 32*c* facing toward each other in the radial direction inside the clutch housing 31. The contact portion 34*c* and the intermediate transmission portion 34*b* projecting outward in the radial direction from the opening of the support member 33 are arranged between the transmission part 32*e* of one drive transmission portion 32*c* and the transmission part 32*e* of the other drive transmission portion 32*c* that are adjacent in the circumferential direction. Further, the pair of drive side cam surfaces 34*e* in each lock member 34 is arranged to be in contact with the pair of transmission parts 32*e* in the rotation direction of the drive side rotation body 32. The lock member 34 is movable along the radial direction of the rotation shaft 7 (i.e., same as radial direction of clutch housing 31) while being guided by the support member 33. When the lock member 34 reaches the radial outward end, the contact portion 34*c* comes into contact with the inner circumferential surface of the support member 33.

When the lock member 34 is arranged at the outermost side in the radial direction, that is, in a state in which the contact portion 34*c* is in contact with the inner circumferential surface of the clutch housing 31, the distance between the driven side cam surfaces 34*d* that face each other is set to be a value that is less than the length in the major axis direction of the cross-sectional shape, that is, the elliptical shape orthogonal to the axial direction of the driven side rotation body 24*b*.

The driven side rotation body 24*b* extends through the pair of through-holes 33*a* of the support member 33 and is arranged between the two driven side cam surfaces 34*d*, which face each other in the radial direction, inside the clutch housing 31 so as to be sandwiched by the pair of lock members 34. In the driven side rotation body 24*b*, the two side surfaces 24*e* face the driven side cam surface 34*d* in the diameter direction of the clutch housing 31 (facing each other in radial direction of rotation shaft 7). The driven side rotation body 24*b* and the pair of lock members 34 each including the driven side cam surface 34*d* configure the driven side cam mechanism. The rotation shaft 7, the clutch housing 31, the drive side rotation body 32, and the worm shaft 24 including the driven side rotation body 24*b* are positioned coaxially, that is, their center axes lie along the same straight line when the clutch 3 is accommodated in the clutch accommodation recess 21*c*.

The operation of the motor will now be described centering on the operation of the clutch 3.

Referring to FIGS. 6(*a*) and 6(*b*), when the load, or the window glass, applies load to the output shaft 27 while the motor unit 1 is stopped, that is, during non-rotational drive of the rotation shaft 7 and non-rotation of the drive side rotation body 32, the load acts to rotate the driven side rotation body 24*b* (worm shaft 24). When the driven side rotation body 24*b* rotates in the direction of the arrow X between the pair of lock members 34, the driven side cam mechanism acts to move the pair of lock members 34 in opposite directions outward in the radial direction. Specifically, since the cross-section of the driven side rotation body 24*b* is an elliptical shape, when the driven side rotation body 24*b* is rotated, the pair of arcuate side surfaces intersecting the major axis of the elliptical shape pushes the driven side cam surface 34*d* of the pair of lock members 34 outward in the radial direction (see arrow Y in FIG. 6(*b*)). The pair of lock members 34 pushed outward in the radial direction by the driven side rotation body 24*b* moves outward in the radial direction of the clutch housing 31 while being guided by the pair of support members 33, and the contact portion 34*c* of the lock member 34 comes into contact with the inner circumferential surface of the clutch housing 31. When the contact portion 34*c* contacts the inner circumferential surface of the clutch housing 31, further movement of the lock member 34 to the outer side in the radial direction is inhibited. Thus, the lock member 34 is sandwiched (interposed) between the clutch housing 31 and the driven side rotation body 24*b*. Thus, further rotation of the driven side rotation body 24*b* is inhibited by the lock member 34 sandwiched between the clutch housing 31 and the driven side rotation body 24*b*. That is, frictional force that inhibits the rotation of the driven side rotation body 24*b* is generated between the contact portion 34*c* of the lock member 34 and the inner circumferential surface of the clutch housing 31. As a result, the rotation of the worm shaft 24 is inhibited, and the transmission of the rotational drive force from the worm shaft 24 to the rotation shaft 7 is inhibited.

In a state in which the contact portion 34c of the pair of lock members 34 is in contact with the inner circumferential surface of the clutch housing 31 thereby inhibiting the rotation of the driven side rotation body 24b, two lock members 34 are moved outward in the radial direction and away from each other so that two drive side cam surfaces 34e facing the two transmission parts 32e of each drive transmission portion 32c are spaced apart from each other in the diameter direction of the clutch housing 31. The two drive transmission portions 32c of the drive side rotation body 32 are each arranged at a neutral position, which is at the central part in the circumferential direction between the two lock members 34 with the movement of the drive side cam surface 34e. Accordingly, the transmission part 32e of the drive side rotation body 32 immediately pushes the drive side cam surface 34e in the rotation direction even when the motor unit 1 is driven from the stopped state and the rotation shaft 7 is rotated in either one of the forward direction or the reverse direction.

The rotation of the driven side rotation body 24b is inhibited in the same manner even when the load applied to the output shaft 27 rotates the driven side rotation body 24b in the direction opposite to the direction of the arrow X (see FIG. 6(b)) between the pair of lock members 34 while the motor unit 1 is stopped.

Figure 7A:
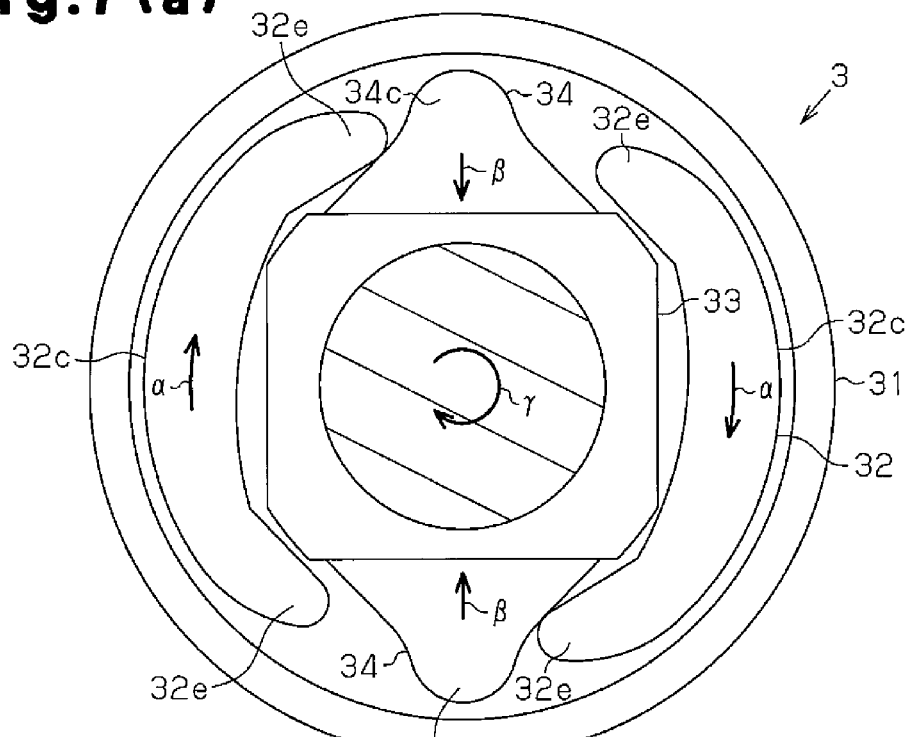
FIG. 7(a) is a cross-sectional view of the clutch when the motor is driven in the first embodiment (cross-sectional view taken along line 6a-6a in FIG. 3)
Figure 7B:
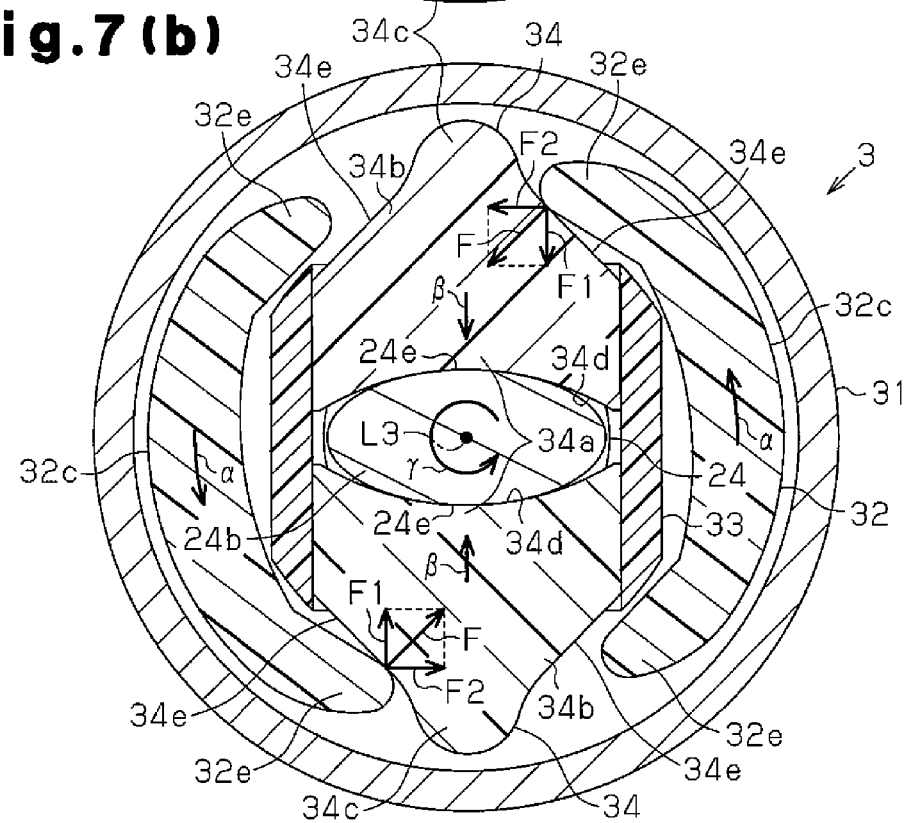
FIG. 7(b) is a cross-sectional view of the clutch when the motor is driven in the first embodiment (cross-sectional view taken along line 6b-6b in FIG. 3)

As shown in FIGS. 7(a) and 7(b), the drive side rotation body 32 rotates (see arrow α) with the rotation shaft 7, which is rotated in the forward direction when the motor unit 1 is driven, that is, during the rotational drive of the rotation shaft 7. The transmission part 32e, which is located at the forward side in the rotation direction of the drive side rotation body 32 in each drive transmission portion 32c, is pushed against the drive side cam surface 34e opposed in the circumferential direction by the rotation of the drive side rotation body 32. As a result, since the drive side cam surface 34e is inclined relative to the radial direction, the contact portion 34c of the lock member 34 moves inward in the radial direction from the inner circumferential surface of the clutch housing 31 due to a component force F1 in the radial direction of a pushing force F, with which the transmission part 32e of the drive side rotation body 32 pushes the drive side cam surface 34e (see arrow N. In this case, the pair of lock members 34 moves towards the inner side in the radial direction of the clutch housing 31 while being guided by the pair of support members 33. The driven side cam surface 34d of the pair of lock members 34 contacts the pair of arcuate side surfaces 24e of the driven side rotation body 24b from the outer side in the radial direction of the clutch housing 31. Further, the pair of lock members 34 is pushed towards the driven side rotation body 24b by the component force F1 and hold the driven side rotation body 24b in between. Moreover, the pair of lock members 34 holding the driven side rotation body 24b is rotated integrally with the drive side rotation body 32 about the center axis L1 of the rotation shaft 7 by a circumferential component force F2 of the pushing force F together with the driven side rotation body 24b (see arrow γ). In other words, the drive side rotation body 32 and the driven side rotation body 24b are coupled and integrally rotated by the lock member 34 sandwiched between the drive side rotation body 32 and the driven side rotation body 24b. In this case, the support member 33 is rotated integrally with the drive side rotation body 32 and the driven side rotation body 24b by means of the lock member 34.

In this manner, the rotational drive force of the rotation shaft 7 is transmitted to the driven side rotation body 24b through the drive side rotation body 32 and the lock member 34. This rotates the worm shaft 24 and the worm wheel 26 and the output shaft 27 rotate accordingly. Thus, the window regulator drive coupled to the output shaft 27 is activated, and the window glass is opened and closed (raised and lowered). The rotational drive force is transmitted in the same manner to the worm shaft 24 even if the rotation shaft 7 is rotationally driven (i.e., reversely rotated) in the direction opposite to the example shown in FIG. 7(a) and FIG. 7(b).

The present embodiment has the advantages described below.

(1) The clutch 3 includes six components, the clutch housing 31, the drive side rotation body 32, the support member 33, the pair of lock members 34, and the driven side rotation body 24b. Therefore, the number of components is reduced compared to the prior art. This simplifies the mechanism of the clutch 3. Further, the pair of lock members 34 is pushed by the driven side rotation body 24b, to which rotational force is applied, and moved outward in the radial direction during non-rotation of the drive side rotation body 32. The pair of lock members 34 is also pushed from the rotation direction by the drive side rotation body 32 and moved towards the driven side rotation body 24b and against the driven side rotation body 24b during rotation of the drive side rotation body 32. In other words, with a simple configuration using the cam mechanism, the clutch 3 transmits rotational drive force of the rotation shaft 7 to the worm shaft 24 and inhibits transmission of rotation from the worm shaft 24 to the rotation shaft 7. Thus, the clutch 3, which includes fewer components and has a simplified mechanism, requires a small number of manufacturing facilities and shortens the coupling time. This reduces the manufacturing cost. Further, the manufacturing cost of a motor including the clutch 3 is reduced.

(2) The lock member 34, which receives rotational drive force of the drive side rotation body 32 (transmission part 32e), is easily moved in the radial direction by the drive side cam surface 34e, which has a simple shape and is formed to incline relative to the radial direction of the rotation shaft 7. Accordingly, the drive side rotation body 32 and the driven side rotation body 24b are easily coupled by the pair of lock members 34 during rotation of the rotation shaft 7.

(3) In the lock member 34, the drive side cam surface 34e, which contacts the transmission part 32e of the drive side rotation body 32 from the rotation direction, is arranged on both circumferential sides of the contact portion 34c. Therefore, the transmission part 32e of the drive side rotation body 32 contacts the drive side cam surface 34e to move each lock member 34 inward in the radial direction during both forward rotation and the reverse rotation of the drive side rotation body 32 caused by the forward rotation and the reverse rotation of the rotation shaft 7. The pair of drive side cam surfaces 34e in each lock member 34 is symmetrically arranged on both circumferential sides of the contact portion 34c. Thus, the radial movement of the lock member 34 occurs in the same manner during both forward rotation and reverse rotation of the drive side rotation body 32.

(4) The pair of lock members 34 is arranged to sandwich the driven side rotation body 24b, and the lock members 34 are moved along the radial direction of the rotation shaft 7. During non-rotation of the drive side rotation body 32, the contact portions 34c of the pair of lock members 34, which are moved outward in the radial direction, are moved away from each other by the rotation of the driven side rotation body 24b and come into contact with the inner circumferential surface of the clutch housing 31. Further rotation of the driven side rotation body 24b is more stably inhibited since the pair of lock members 34 are arranged between the driven side rotation body 24b and the clutch housing 31. During rotation of the drive side rotation body 32, the rotational drive force of the drive side rotation body 32 is more stably transmitted to the driven side rotation body 24b since the pair of lock members 34, which are moved inward in the radial direction, move toward each other and push the side surface 24e of the driven side rotation body 24b.

(5) The pair of lock members 34 is attached to the support member 33. The support member 33 stabilizes movement in the radial direction of the lock member 34 during rotation of the drive side rotation body 32 and the driven side rotation body 24b. This stabilizes transmission of the rotational drive force to the driven side rotation body 24b through the lock member 34 during rotation of the drive side rotation body 32 and the inhibition of the rotation of the driven side rotation body 24b during non-rotation of the drive side rotation body 32. Further, the support member 33 constantly supports the lock member 34 since the drive side rotation body 32 and the driven side rotation body 24b are integrally rotated by the lock member 34.

(6) The driven side rotation body 24b is rod-shaped, and each of the pair of lock members 34 includes the driven side cam surface 34d radially facing the driven side rotation body 24b on the side surface on the opposite side of the contact portion 34c. During non-rotation of the drive side rotation body 32, the driven side cam surface 34d is pushed outward in the radial direction by the driven side rotation body 24b when the driven side rotation body 24b is rotated so that the lock member 34 moves outward in the radial direction. Thus, during non-rotation of the drive side rotation body 32, the driven side rotation body 24b, which is rod-shaped, and the driven side cam surface 34d act to easily move the lock member 34 outward in the radial direction.

(7) The clutch 3 includes the pair of lock members 34 arranged to sandwich the driven side rotation body 24b, which is rod-shaped. During rotation of the drive side rotation body 32, the pair of lock members 34 holds in between the driven side rotation body 24b, which is rod-shaped, at the driven side cam surface 34d when receiving the rotational drive force of the drive side rotation body 32. Therefore, the transmission of the rotational drive force through the lock member 34 is further stably carried out.

(8) The driven side rotation body 24b has a simple shape in which its cross-section is elliptical, and is thus easy to form. In particular, the driven side rotation body 24b arranged in the metal worm shaft 24 is easily formed through machining. The rotation of the driven side rotation body 24b, which has an elliptical cross-section, easily pushes the lock member 34 outward in the radial direction.

(9) The shape of each driven side cam surface 34d as viewed from the axial direction is arcuate and can hold in between the side surface 24e of the driven side rotation body 24b. Accordingly, during rotation of the drive side rotation body 32, the pair of lock members 34 more stably holds the driven side rotation body 24b. Further, during non-driving of the drive side rotation body 32, the lock member 34 is smoothly moved outward in the radial direction as the driven side rotation body 24b rotates.

(10) The driven side rotation body 24b is rod-shaped and has an elliptical cross-section and thus may be miniaturized in the radial direction from the conventional driven side rotation body. Further, the driven side rotation body 24b has a simple shape. This reduces the mold cost, the material cost, and the processing cost for forming the driven side rotation body 24b.

(11) The conventional clutch is configured to inhibit the rotation of the driven side rotation body using the wedge effect produced when the rolling element is sandwiched between the driven side rotation body and the collar during driving of the rotation shaft. Thus, high component accuracy is required for the components of the clutch. The clutch 3 of the present embodiment, on the other hand, is configured to inhibit the rotation of the driven side rotation body 24b using the frictional force between the lock member 34 and the clutch housing 31. Thus, the components of the clutch 3 are not required to have such a high accuracy as the conventional clutch. Therefore, the manufacturing cost of the clutch 3 is reduced.

A second embodiment of the present invention will now be described with reference to FIGS. 8 to 11. In the second embodiment, same reference numerals are given to those components that are the same as the first embodiment. Such components will not be described.

Figure 8:
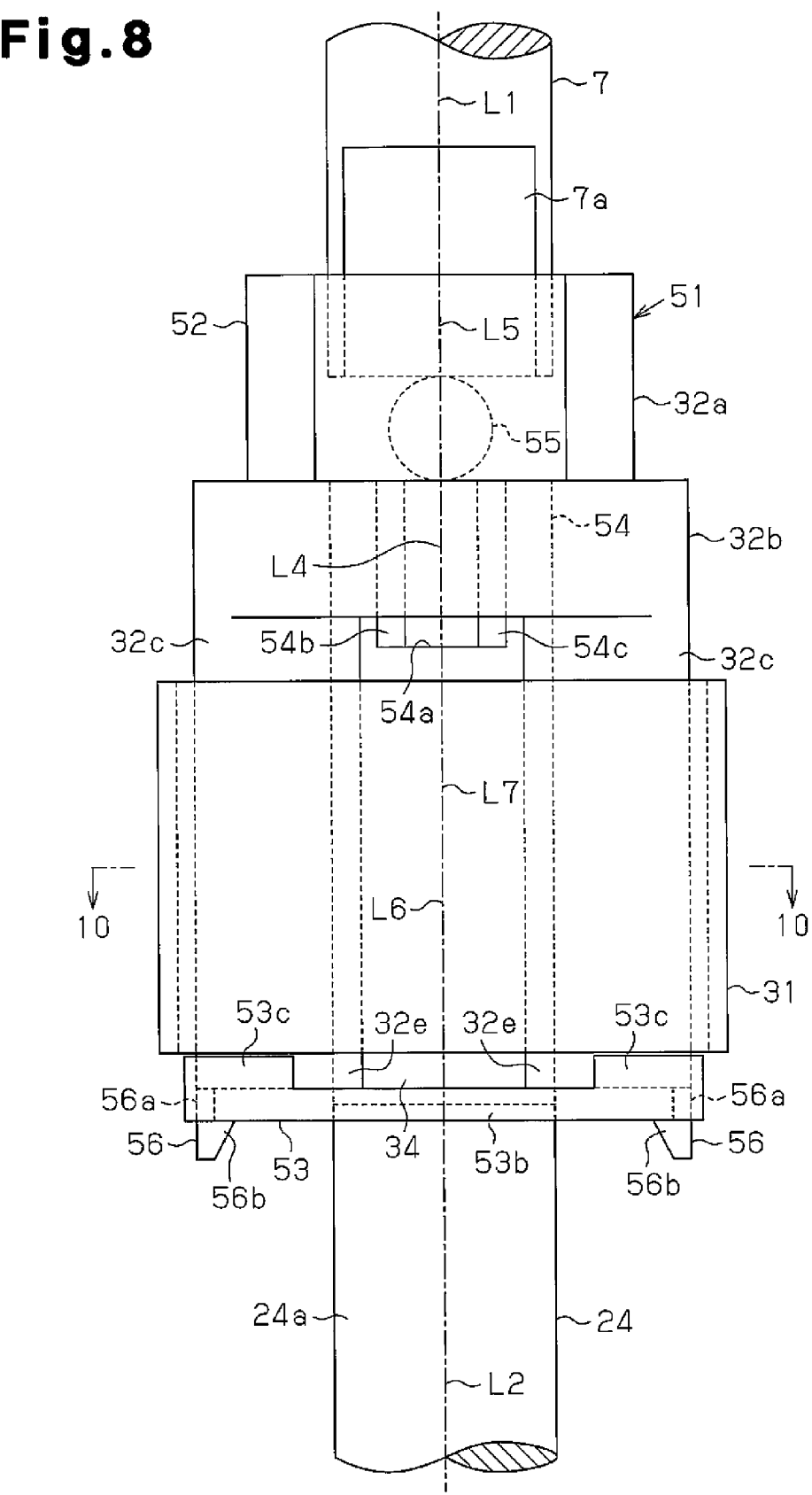
FIG. 8 is a side view of a clutch according to a second embodiment of the present invention.

A clutch 51 shown in FIG. 8 is arranged in the motor in lieu of the clutch 3 of the first embodiment. The clutch 51 of the present embodiment includes the clutch housing 31, a drive side rotation body 52, a support member 53, the pair of lock members 34, a driven side rotation body 54, and a steel ball 55.

Figure 9:
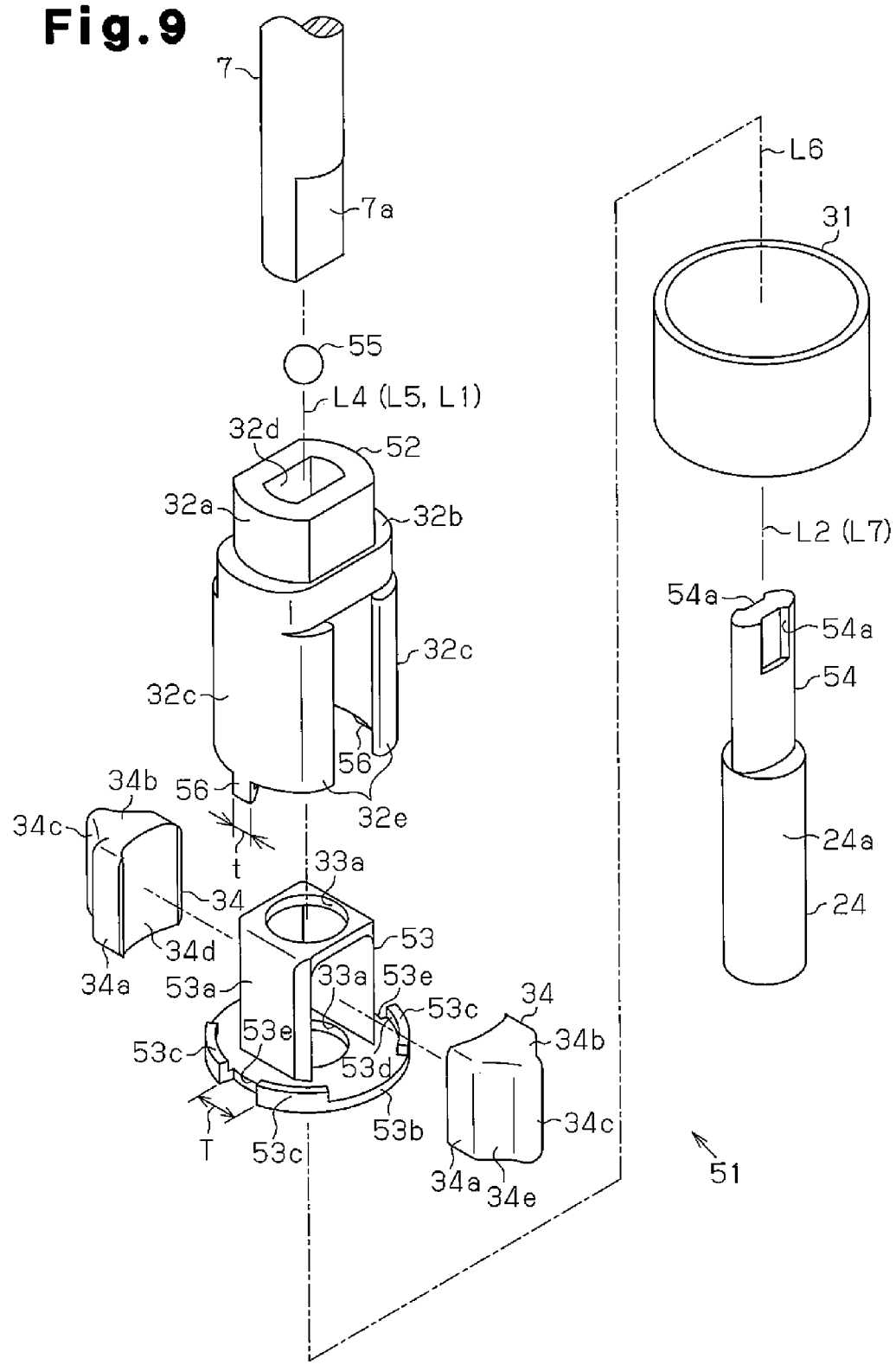
FIG. 9 is an exploded perspective view of the clutch of FIG. 8.
Figure 10A:
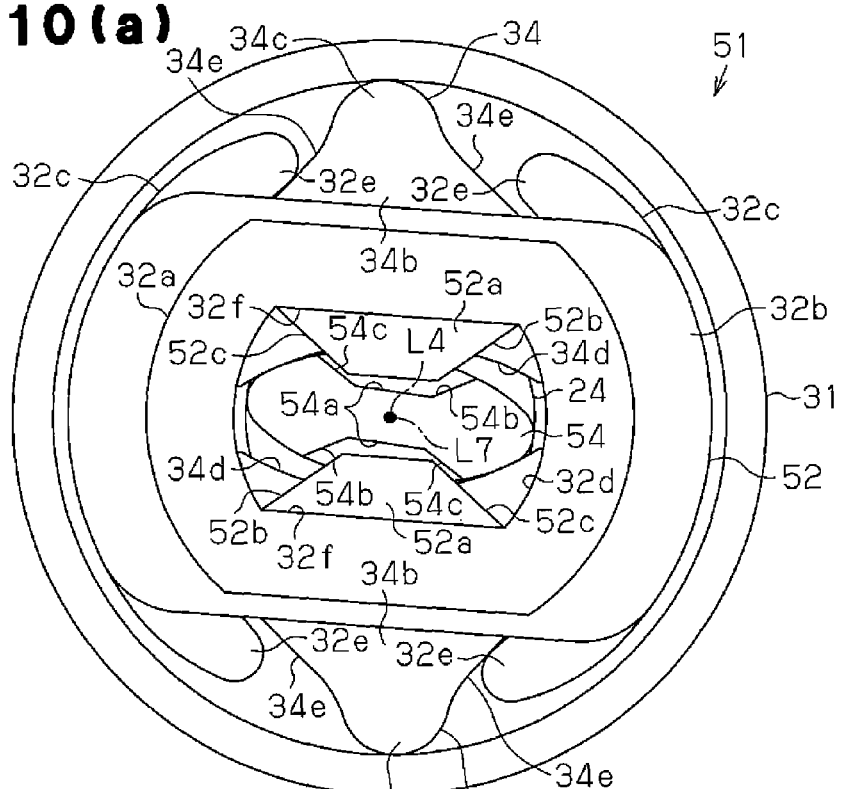
FIGS. 10(a) and 10(b) are cross-sectional views of the clutch when the motor is stopped in the second embodiment (cross-sectional view taken along line 10-10 in FIG. 8)

As shown in FIG. 9, the drive side rotation body 52, which is arranged inside the clutch housing 31, is formed from resin and is integrally formed with the drive coupling portion 32a, the support portion 32b, and the pair of drive transmission portions 32c. As shown in FIG. 10(a), a pair of transmission projections 52a is formed on the inner circumferential surface of the coupling hole 32d extending in the direction of the center axis L4 through the central part of the drive coupling portion 32a and the support portion 32b. The pair of transmission projections 52a are integrally arranged on a pair of flat portions 32f extending parallel to each other of the inner circumferential surface of the support portion 32b defining the coupling hole 32d. The pair of transmission projections 52a project towards the center of the coupling hole 32d. The support portion 32b of each transmission projection 52a as viewed from the direction of the center axis L4 has a trapezoidal shape in which the circumferential width becomes narrower from the basal end (portion closer to flat portion 32f) towards the distal end (portion closer to center axis L4). Both circumferential end faces of each transmission projection 52a are drive side transmission surfaces 52b, 52c extending parallel to the center axis L4. The pair of transmission projections 52a of the present embodiment includes the drive side transmission surface 52b in the clockwise direction and the drive side transmission surface 52c in the counterclockwise direction as viewed from the drive coupling portion 32a (i.e., state shown in FIG. 10(a)).

As shown in FIGS. 8 and 9, a pair of engagement hooks 56 extending along the center axis L4 of the support portion 32b is formed at the central part in the circumferential direction at the distal end in the axial direction of the pair of drive transmission portions 32c. The engagement hooks 56 of the pair are spaced apart from each other by 180° in the circumferential direction in the drive side rotation body 52. Each engagement hook 56 includes a quadratic prism shaped engagement shaft portion 56a, which extends along the axial direction of the rotation shaft 7 from the distal end face of the drive side rotation body 52, and an engagement projection 56b, which projects inward in the radial direction from the distal end of the engagement shaft portion 56a. The radially outer side surface of the engagement shaft portion 56a of each engagement hook 56 is flush with the radially outer side surface of the drive transmission portion 32c, and the radially inner side surface of the engagement shaft portion 56a is located outward in the radial direction from the radially inner side surface of the drive transmission portion 32c. Each engagement hook 56 is tiltable in the radial direction of the rotation shaft 7 by elastic deformation.

As shown in FIG. 9, the support member arranged between the pair of drive transmission portions 32c is formed from resin material and has the shape of a hollow box in the same manner as the support member 33 of the first embodiment. A support main body portion 53a configuring the support member 53 has a shape similar to the support member 33 of the first embodiment. In other words, the support member 53 includes a pair of end walls facing each other in the axial direction of the rotation shaft 7, and a circular through-hole 33a is formed in the end wall.

A substantially ring-shaped base portion 53b extending outward in the radial direction is formed integrally with the lower end of the support main body portion 53a. The base portion 53b, which extends perpendicular to the axial direction of the rotation shaft 7, is formed so that the outer diameter is slightly greater than the outer diameter of the entire pair of drive transmission portions 32c in the drive side rotation body 52 and slightly smaller than the inner diameter of the clutch housing 31. Further, as shown in FIG. 8, the thickness of the base portion 53b is substantially equal to the length of the portion of the engagement hook 56 excluding the engagement projection 56b, that is, the axial length of the engagement shaft portion 56a.

As shown in FIG. 9, two pairs of restriction portions 53c are formed integrally with the outer circumferential edge of the base portion 53b. Each pair of the restriction portion 53c corresponds to each drive transmission portion 32c of the drive side rotation body 52. One pair of the restriction portions 53c is formed at a position spaced apart by 180° in the circumferential direction from the other pair of the restriction portion 53c. Each restriction portion 53c extends along the axial direction of the rotation shaft 7 so that the distal end faces upward (toward the drive side rotation body 52). The distance T between the pair of restriction portions 53c is formed to be greater than the circumferential width t of the engagement hook 56. The curvature of the restricting surface 53d or the inner circumferential surface of each restriction portion 53c is formed to be equal to the curvature (see FIG. 10(b)) of the outer circumferential surface of the portion between the transmission parts 32e of the drive transmission portion 32c. Further, the restricting surfaces 53d of all the restriction portions 53c are arranged on the same circle (not shown), the center of which is the center of the base portion 53b. The diameter of the circle extending through the restricting surfaces 53d of all the restriction portions 53c is equal to the outer diameter of the entire pair of drive transmission portions 32c in the drive side rotation body 52. The outer diameter of the base portion 53b including the restriction portion 53c is slightly smaller than the inner diameter of the clutch housing 31.

An engagement recess 53e is formed between the pair of restriction portions 53c in the base portion 53b. The two engagement recesses 53e are engaged with the two engagement hooks 56 of the drive side rotation body 52 to integrate the drive side rotation body 52 and the support member 53. Each engagement recess 53e is recessed inward in the radial direction from the outer circumferential edge of the base portion 53b. As shown in FIG. 8, the radial length at the portion of the two engagement recesses 53e is equal to the interval between the engagement shaft portions 56a of the pair of engagement hooks 56 in the base portion 53b. The circumferential width of each engagement recess 53e is formed to be equal to the distance T between the pair of restriction portions 53c.

The support member 53 is arranged relative to the drive side rotation body 52 such that the support main body portion 53a, which accommodates the pair of lock members 34, is arranged between the pair of drive transmission portions 32c and integrated with the drive side rotation body 52 when the engagement hook 56 at the distal end of each drive transmission portion 32c engages the corresponding engagement recess 53e. In this case, as shown in FIGS. 8 and 9, the support member 53 is arranged relative to the drive side rotation body 52 such that the support main body portion 53a is inserted between the pair of drive transmission portions 32c from the distal end side of the pair of drive transmission portions 32c, and the pair of engagement hooks 56 is inserted into the pair of engagement recesses 53e. The base portion 53b (engagement recess 53e) and the engagement hook 56 are snap-fitted by having the engagement projection 56b of the engagement hook 56 go beyond the base portion 53b from the support main body portion 53a side so that the support member 53 and the drive side rotation body 52 are integrally coupled.

In the support member 53 and the drive side rotation body 52, which are integrated through the pair of engagement hooks 56, a pair of restriction portions 53c is arranged outward in the radial direction from the outer circumferential surface of each drive transmission portion 32c, and the restricting surface 53d of the pair of restriction portions 53c comes into contact with the outer circumferential surface at the distal end of each drive transmission portion 32c. Thus, each drive transmission portion 32c is restricted from moving outward in the radial direction by the restriction portion 53c. The distance T between the pair of restriction portions 53c is greater than the circumferential width t of the engagement hook 56. Hence, the drive side rotation body 52 can rotate in the circumferential direction relative to the support member 53 within the range of the distance T between the restriction portions 53c.

In the same manner as the driven side rotation body 24b of the first embodiment, the driven side rotation body 54 extends along the axial direction from the basal end face of the worm shaft main body 24a and is rod-shaped such that the cross-section orthogonal to the axial direction has an elliptical shape. The center axis L7 of the driven side rotation body 54 conforms to the center axis L2 of the worm shaft main body 24a. The driven side rotation body 54 is arranged between two driven side cam surfaces 34d facing each other in the radial direction inside the clutch housing 31 so as to be sandwiched by the pair of lock members 34 through the pair of through-holes 33a of the support member 53. The distal end of the driven side rotation body 54 is inserted into the coupling hole 32d of the support portion 32b, and the steel ball 55, which receives the thrust load of the rotation shaft 7 and the worm shaft 24, is arranged between the distal end face of the rotation shaft 7 and the distal end face of the driven side rotation body 54.

As shown in FIGS. 9 and 10(a), the pair of transmission recesses 54a is formed at the distal end of the driven side rotation body 54, and the distal ends of a pair of transmission projections 52a arranged on the drive side rotation body 52 are inserted into the pair of transmission recesses 54a, respectively. Each recess of the pair of transmission recesses 54a opens outward in the radial direction in the short-side direction of the cross-section of the drive side rotation body 52. Each recess of the pair of transmission recesses 54a opens toward the distal end side (upper side in FIG. 9) of the drive side rotation body 52. Each transmission recess 54a has a shape as viewed from the direction of the center axis L7 of the driven side rotation body 54 formed to a substantially trapezoid shape in which the circumferential width becomes narrower from the radial outward opening towards the radial inward bottom surface. The inner side surfaces at both ends in the circumferential direction of each transmission recess 54a form the driven side transmission surfaces 54b, 54c having a planar shape parallel to the center axis L7 of the driven side rotation body 54. Each transmission recess 54a of the present embodiment includes the driven side transmission surface 54b at the clockwise direction and the driven side transmission surface 54c at the counterclockwise direction when viewed from the distal end side of the driven side rotation body 54, that is, in the state shown in FIG. 10(a).

The drive side transmission surfaces 52b, 52c and the driven side transmission surfaces 54b, 54c will now be described in detail. As shown in FIG. 10(a), the transmission projection 52a arranged in each transmission recess 54a has the driven side transmission surface 54b in the clockwise direction facing the driven side transmission surface 54b in the clockwise direction of the transmission recess 54a in the circumferential direction, and the drive side transmission surface 52c in the counterclockwise direction facing the driven side transmission surface 54c in the counterclockwise direction of the transmission recess 54a in the circumferential direction as viewed from the distal end side of the driven side rotation body 54. The drive side transmission surface 52b and the driven side transmission surface 54b that face each other and the drive side transmission surface 52c and the driven side transmission surface 54c that face each other have an inclination angle or the like set such that the surfaces facing each other come into contact when the rotational force acts from the drive side rotation body 52, and the surfaces facing each other do not come into contact when the rotational force acts from the driven side rotation body 54. Therefore, when the rotational force acts from the drive side rotation body 52, the drive side transmission surface 52b and the driven side transmission surface 54b facing each other, as well as the drive side transmission surface 52c and the driven side transmission surface 54c facing each other come into contact, respectively, and the rotational drive force is transmitted from the drive side transmission surfaces 52b, 52c to the driven side rotation body 54 through the driven side transmission surfaces 54b, 54c.

The operation of the motor will now be described centering on the operation of the clutch 51.

Figure 10B:
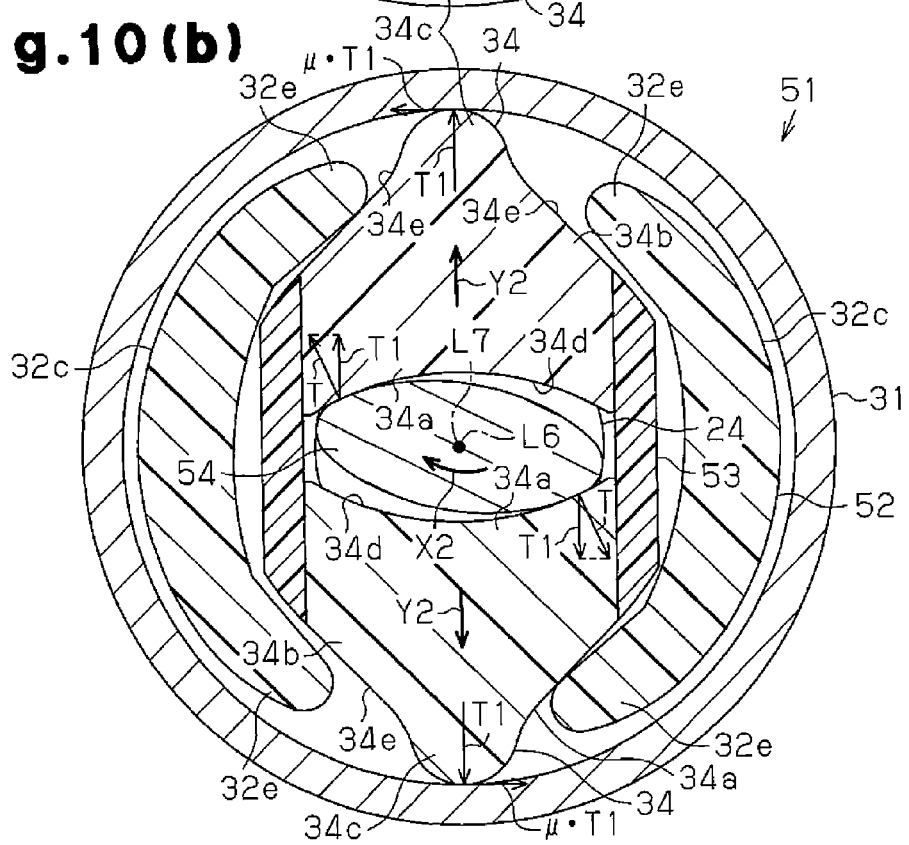
Figure 11:
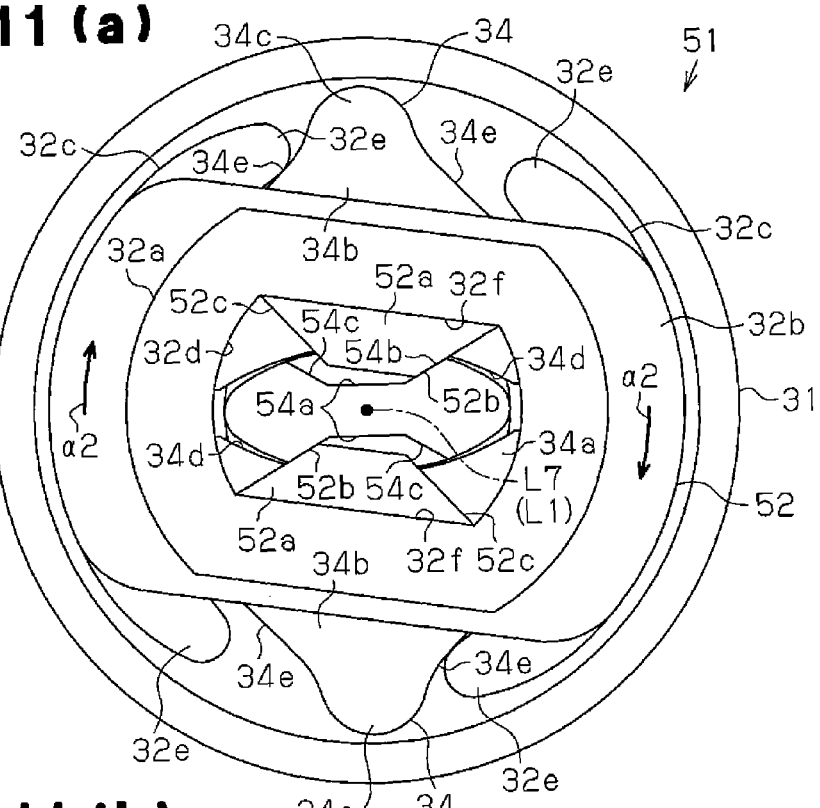
FIGS. 11(a) and 11(b) are cross-sectional views of the clutch when the motor is driven in the second embodiment (cross-sectional view taken along line 10-10 in FIG. 8).
Figure 11:
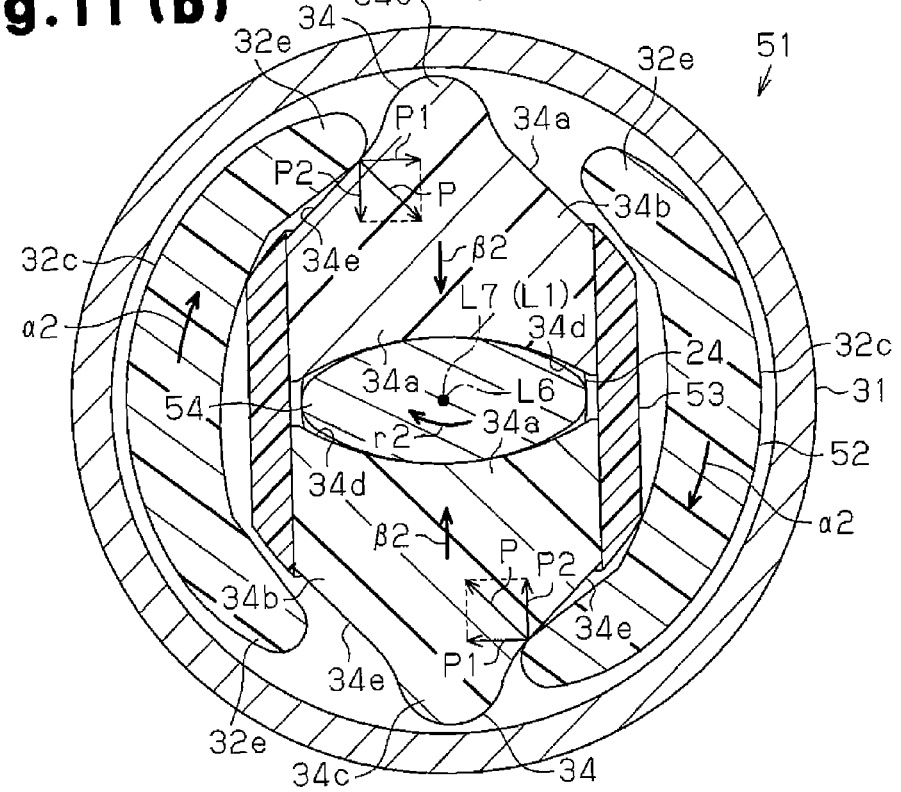

As shown in FIGS. 10(a) and 10(b), when the load, that is, the window glass, applies load to the output shaft 27 during non-driving of the rotation shaft 7 and non-rotation of the drive side rotation body 52, the load acts to rotate the driven side rotation body 54 (worm shaft 24). When the driven side rotation body 54 rotates in the direction of the arrow X2 between the pair of lock members 34, the driven side cam mechanism functions to move the pair of lock members 34 outward in the radial direction in opposite directions (see arrow Y2 in FIG. 10(b)). More specifically, since the cross-section of the driven side rotation body 24b has an elliptical shape, when the driven side rotation body 54 rotates, both ends in the major axis direction of the elliptical shape push the driven side cam surfaces 34d of the pair of lock members 34 outward in the radial direction. The pair of lock members 34 pushed outward in the radial direction by the driven side rotation body 54 move toward the outer side in the radial direction of the clutch housing 31 while being guided by the pair of support main body portions 53a so that the contact portion 34c of the lock member 34 contacts the inner circumferential surface of the clutch housing 31. When the contact portion 34c contacts the inner circumferential surface of the clutch housing 31, further outward movement of the lock member 34 in the radial direction is inhibited. Hence, the lock member 34 is sandwiched (interposed) between the clutch housing 31 and the driven side rotation body 54. Therefore, further rotation of the driven side rotation body 54 is inhibited by the lock member 34 sandwiched by the clutch housing 31 and the driven side rotation body 54. That is, frictional force that inhibits the rotation of the driven side rotation body 54 is generated between the contact portion 34c of the lock member 34 and the inner circumferential surface of the clutch housing 31. As a result, the rotation of the worm shaft 24 is inhibited, and the transmission of the rotational drive force from the worm shaft 24 to the rotation shaft 7 is inhibited. The frictional force in this case is expressed as $\mu \cdot T1$ using the radial component force T1 of the pushing force T applied from the driven side rotation body 54 to the lock member 34 (component force in the direction along the movement direction of the lock member 34 in the pushing force T), and the friction coefficient $\mu$. In this case, the rotational force is not directly applied from the driven side rotation body 54 to the drive side rotation body 52 since the drive side transmission surface 52b and the driven side transmission surface 54b, as well as the drive side transmission surface 52c and the driven side transmission surface 54c facing each other in the rotation direction of the driven side rotation body 54 are respectively held in the non-contacting state.

When the driven side rotation body 54 is rotated from the output shaft 27 (see FIG. 1) side in the direction opposite to the example shown in FIGS. 10(a) and 10(b) during non-drive of the rotation shaft 7, the rotation is inhibited in the same manner.

As shown in FIGS. 11(a) and 11(b), the drive side rotation body 52 rotates with the forward rotating rotation shaft 7 during rotational drive of the rotation shaft 7 (see arrow α2). The transmission part 32e at the front side in the rotation direction in each drive transmission portion 32c is then pushed against the drive side cam surface 34e facing in the circumferential direction by the rotation of the drive side rotation body 52. If the rotation shaft 7 is rotationally driven from the state shown in FIGS. 10(a) and 10(b), the locking (inhibition of rotation) of the lock member 34 is released when the circumferential component force P1 of the pushing force P for pushing the drive side cam surface 34e becomes greater than or equal to the frictional force $\mu \cdot T1$ (see FIG. 10(b)), which is generated between the contact portion 34c of the lock member 34 and the inner circumferential surface of the clutch housing 31.

When each drive transmission portion 32c is pushed against the drive side cam surface 34e at the front side in the rotation direction by the rotation of the drive side rotation body 52, the contact portion 34c of the lock member 34 is moved away from the inner circumferential surface of the clutch housing 31 (see arrow β2) by the radial component force P2 of the pushing force P of the transmission part 32e because the drive side cam surface 34e is inclined relative to the radial direction. In this case, the pair of lock members 34 moves towards the inner side in the radial direction of the clutch housing 31 while being guided by the pair of support members 53. The driven side cam surfaces 34*d* of the pair of lock members 34 come into contact with the pair of arcuate side surfaces 24*e* of the driven side rotation body 54 from the outer side in the radial direction of the clutch housing 31. The pair of driven side cam surfaces 34*d* is brought into contact with respect to the driven side rotation body 54 along the minor axis direction of the elliptical shape in the driven side rotation body 54. Further, the pair of lock members 34 is pushed towards the driven side rotation body 54 by the component force P2 to hold in between the driven side rotation body 54.

When the drive side rotation body 52 is rotated and each drive transmission portion 32*c* is pushed against the drive side cam surface 34*e* at the front side in the rotation direction so that the pair of lock members 34 move inward in the radial direction, each drive side transmission surface 52*b* may contact the driven side transmission surface 54*b* facing each other in the rotation direction of the drive side rotation body 52. The rotational drive force of the rotation shaft 7 is then transmitted to the driven side rotation body 54. In this case, the pair of lock members 34 holding in between the driven side rotation body 54 are rotated integrally with the drive side rotation body 52 about the center axis L1 of the rotation shaft 7 (see arrow γ2) by the circumferential component force P1 of the pushing force P generated by the transmission part 32*e* together with the driven side rotation body 54. In other words, the drive side rotation body 52 and the driven side rotation body 54 are coupled and integrally rotated through the lock member 34 sandwiched between the drive side rotation body 52 and the driven side rotation body 54 and further through the drive side transmission surface 52*b* and the driven side transmission surface 54*b*. The support member 53 rotates integrally with the drive side rotation body 52 and the driven side rotation body 54 through the lock member 34.

Therefore, the rotational drive force of the rotation shaft 7 is transmitted to the driven side rotation body 54 through the drive side rotation body 52 and the lock member 34. When the worm shaft 24 rotates, the worm wheel 26 and the output shaft 27 rotate in accordance with the rotation. The window regulator drive coupled to the output shaft 27 is thus activated, and the window glass is opened and closed (raised and lowered). The rotational drive force is transmitted in the same manner to the worm shaft 24 even if the rotation shaft 7 is rotated (i.e., reverse rotated) in the direction opposite to the example shown in FIG. 11(*a*) and FIG. 11(*b*).

In addition to advantages (1) to (11) of the first embodiment, the present embodiment has the advantages described below.

(12) The pair of drive transmission portions 32*c* is restricted from moving outward in the radial direction by the restriction portion 53*c* arranged in the support member 53. Thus, the drive transmission portion 32*c* efficiently pushes the drive side cam surface 34*e* in the rotation direction of the drive side rotation body 52 with the rotation of the drive side rotation body 52 during rotation of the drive side rotation body 52.

(13) The drive side rotation body 52 and the support member 53 are integrated by inserting the engagement hook 56 to the engagement recess 53*e* and snap-fitting it to the base portion 53*b*. Hence, the drive side rotation body 52 and the support member 53 may be handled as an integrated unit. Therefore, component management is facilitated, and the assembly task of the clutch 51 is easily carried out.

(14) The drive side transmission surfaces 52*b*, 52*c* arranged in the drive side rotation body 52 and the driven side transmission surfaces 54*b*, 54*c* arranged in the driven side rotation body 54 come into contact with each other in the rotation direction of the drive side rotation body 52 during rotation of the drive side rotation body 52 so that the rotational drive force of the drive side rotation body 52 is efficiently transmitted to the driven side rotation body 54. Further, the rotational transmission from the drive side rotation body 52 to the driven side rotation body 54 may be carried out using the drive side transmission surfaces 52*b*, 52*c* and the driven side transmission surfaces 54*b*, 54*c*. Therefore, the dimension accuracy of each member can be lowered, and the noise and vibration are reduced compared to when carrying out the rotational transmission from the drive side rotation body 32 to the driven side rotation body 24*b* with the pair of lock members 34 and the driven side rotation body 24*b* like in the clutch 3 of the first embodiment.

The embodiments of the present invention may be modified as described below.

In the first and second embodiments, the present invention has been described using a motor used as a drive source of the power window device by way of example, but the present invention may be applied to a motor including the motor unit 1 having the rotation shaft 7 and the deceleration unit 2 having the worm shaft 24 other than the motor used as a drive source of the power window device. Other than the motor, the clutch 3, 51 may be used in a device equipped with a drive shaft to be rotatably driven, and a driven shaft to which the rotational drive force of the drive shaft is transmitted.

In the clutch 3 of the first embodiment, during non-rotation of the drive side rotation body 32, the pair of lock members 34 is sandwiched with the driven side rotation body 24*b* and the inner circumferential surface of the clutch housing 31, and formed to allow the rotation of the driven side rotation body 24*b* with respect to the pair of lock members 34 in a state the desired frictional force is generated between the contact portion 34*c* of each lock member 34 and the inner circumferential surface of the clutch housing 31. In other words, when the driven side rotation body 24*b* is rotated during non-rotation of the drive side rotation body 32, the driven side rotation body 24*b* becomes difficult to rotate by the frictional force generated between the contact portion 34*c* and the inner circumferential surface of the clutch housing 31, and the rotation of the pair of lock members 34 with respect to the clutch housing 31 is inhibited. Accordingly, the clutch 3 can be easily designed since the pair of lock members 34 and the driven side rotation body 24*b* merely needs to be formed to a shape suitable for generating the desired frictional force. As a result, the manufacturing cost of the clutch 3 can be further reduced. This is similar to the clutch 51 of the second embodiment.

In the motor of the first embodiment, during non-rotation of the rotation shaft 7, the pair of lock members 34 is sandwiched by the driven side rotation body 24*b* and the inner circumferential surface of the clutch housing 31, the rotation of the driven side rotation body 24*b* with respect to the pair of lock members 34 is allowed in a state the desired frictional force is generated between the contact portion 34*c* of the lock member 34 and the inner circumferential surface of the clutch housing 31, and the rotational force from the output shaft 27 drive coupled to the worm wheel 26 may be inhibited from being transmitted to the rotation shaft 7 by at least the engagement load of the worm wheel 26 and the screw teeth portion 24*c* of the worm shaft main body 24*a*, the friction load of the worm shaft main body 24*a* and the bearings 25*a*, 25*b* axially supporting the worm shaft main body 24*a*, and the rotation load of the clutch 3. The rotation load of the clutch 3 is the frictional force (friction load) generated inside the clutch 3. Thus, the rotational drive force of the rotation shaft 7 is transmitted to the output shaft 27 through the clutch 3, the worm shaft main body 24a including the screw teeth portion 24c, and the worm wheel 26, whereas the rotational force from the output shaft 27 is inhibited from being transmitted to the rotation shaft 7 by at least the engagement load of the worm wheel 26 and the screw teeth portion 24c, the friction load of the worm shaft main body 24a and the bearings 25a, 25b, and the rotation load of the clutch 3. That is, instead of inhibiting the rotational force from the output shaft 27 from being transmitted to the rotation shaft 7 with the clutch 3 alone, the rotational force from the output shaft 27 is inhibited from being transmitted to the rotation shaft 7 with the entire motor including the clutch 3, and hence high dimension accuracy is not required on each configuring component of the clutch 3. Thus, the manufacturing cost of the motor can be further reduced. That load that inhibits the rotational force from the output shaft 27 from being transmitted to the rotation shaft 7 is not limited to the engagement load of the worm wheel 26 and the screw teeth portion 24c, the friction load of the worm shaft main body 24a and the bearings 25a, 25b, and the friction load of the clutch 3, and may include the friction load or the like of other further slidably moving portions inside the motor. This is similar in the motor equipped with the clutch 51 of the second embodiment.

In each embodiment described above, the cross-section orthogonal to the axial direction in the driven side rotation bodies 24b, 54 is elliptical and the driven side rotation bodies 24b, 54 are rod-shaped as a whole. However, the cross-sectional shape orthogonal to the axial direction in the driven side rotation body 24b, 54 may be flat as long as the shape enabling the lock member 34 to be pushed outward in the radial direction with its rotation is formed. For instance, in the driven side rotation body 24b, 54, the cross-section orthogonal to the axial direction thereof may have a rectangular shape and the driven side rotation body 24b, 54 may have a column shape as a whole.

In each embodiment described above, the driven side cam surface 34d is formed to an arcuate shape, but may be a planar shape parallel to the axial direction.

In the first embodiment described above, the clutch 3 includes a pair of lock members 34, but may include one lock member 34. In this case, during rotation of the drive side rotation body 32, the rotational drive force of the drive side rotation body 32 is transmitted to the driven side rotation body 24b through the lock member 34 when one lock member 34 pushed by the drive side rotation body 32 is pushed against the driven side rotation body 24b. The clutch 3 may be configured to include three lock members 34. In this case, three drive transmission portions 32c are arranged on the drive side rotation body 32 according to the number of lock members 34. This is similar to the clutch 51 of the second embodiment.

In the second embodiment described above, the pair of engagement hooks 56 for axially engaging and integrating the drive side rotation body 52 and the support member 53 is arranged on the drive side rotation body 52. However, the pair of engagement hooks 56 may be arranged on the support member 53 that can be axially engaged with respect to the drive side rotation body 52. The pair of engagement hooks 56 and the pair of engagement recesses 53e merely needs to be formed on at least one of either the drive side rotation body 52 or the support member 53, and the shape is also not limited to the shape of the second embodiment. The pair of engagement hooks 56 and the pair of engagement recesses 53e are formed to axially engage the drive side rotation body 52 and the support member 53 while allowing the relative rotation in the circumferential direction of the support member 53 and the drive side rotation body 52.

In the second embodiment described above, the support member 53 includes two restriction portions 53c in correspondence with each drive transmission portion 32c. However, one restriction portion 53c may be arranged in correspondence with each drive transmission portion 32c, or three or more may be arranged in correspondence with each drive transmission portion 32c.

In the first embodiment described above, the lock member 34 is supported by the support member 33, but the support member 33 may be omitted as long as the lock member 34 can move along the radial direction with the rotation of the drive side rotation body 32 and the driven side rotation body 24b. Further, in the clutch 51 of the second embodiment, the support member 53 may be omitted as long as the lock member 34 can move along the radial direction with the rotation of the drive side rotation body 52 and the driven side rotation body 54.

In each embodiment described above, each lock member 34 includes a pair of drive side cam surfaces 34e. However, each lock member 34 may be configured to include one drive side cam surface 34e. In this case, the motor unit 1 is configured to rotate the rotation shaft 7 only in one direction, and the drive side cam surface 34e is formed to be positioned on the front side in the rotation direction of the rotation shaft 7 with respect to the drive transmission portion 32c.

In each embodiment described above, the driven side rotation body 24b, 54 may be formed as a separate body from the worm shaft main body 24a. In this case, the driven side rotation body 24b, 54 and the worm shaft main body 24a are formed to be integrally rotatable (to engage in rotation direction). The drive side rotation body 32, 52 may be formed integrally with the rotation shaft 7.

DESCRIPTION OF REFERENCE CHARACTERS 1 motor unit
2 deceleration unit
3, 51 clutch
7 rotation shaft serving as drive shaft
24a worm shaft main body serving as driven shaft
24b, 54 driven side rotation body serving as camshaft
24c screw teeth portion
25a, 25b bearing
26 worm wheel
27 output shaft
31 clutch housing
32, 52 drive side rotation body
33, 53 support member
34 lock member
34c contact portion
34d driven side cam surface
34e drive side cam surface
52b, 52c drive side transmission surface serving as transmission surface
53c restriction portion
54b, 54c driven side transmission surface serving as transmission surface
56 engagement hook serving as engagement portion

The invention claimed is:

1. A clutch comprising:
a drive shaft;
a drive side rotation body integrally rotatable with the drive shaft;
a driven shaft arranged coaxially with the drive shaft;
a driven side rotation body integrally rotatable with the driven shaft;
a clutch housing in which the drive side rotation body and the driven side rotation body can be arranged; and
a lock member arranged between the drive side rotation body and the driven side rotation body inside the clutch housing, wherein the lock member includes a contact portion, which contacts with and separates from an inner circumferential surface of the clutch housing, and a drive side cam surface with which the drive side rotation body comes into contact from a rotation direction,
wherein
the drive side cam surface includes a part of an outer peripheral surface of the lock member,
the driven side rotation body includes a camshaft having an elliptical cross-section,
the elliptical cross-section includes a major axis and a minor axis, the major axis being longer than the minor axis,
during non-rotation of the drive side rotation body, when the driven side rotation body is rotated, the lock member is pushed by the driven side rotation body and moved outward in a radial direction thereby bringing the contact portion into contact with the inner circumferential surface of the clutch housing such that the lock member is sandwiched between the clutch housing and the driven side rotation body and inhibits further rotation of the driven side rotation body, and
during rotation of the drive side rotation body, the drive side rotation body pushes the drive side cam surface in the rotation direction, and the drive side cam surface acts to move the lock member inward in the radial direction and push the lock member against the driven side rotation body so that the lock member is sandwiched between the drive side rotation body and the driven side rotation body thereby coupling the drive side rotation body and the driven side rotation body with the lock member to be integrally rotatable.

2. The clutch according to claim 1, wherein the drive side cam surface is inclined relative to the radial direction of the drive shaft so that the lock member is moved in the radial direction of the drive shaft when the drive side cam surface is pushed in the rotation direction by the drive side rotation body.

3. The clutch according to claim 2, wherein the lock member includes a pair of drive side cam surfaces, and the pair of drive side cam surfaces are arranged in symmetry at two circumferential sides of the contact portion.

4. The clutch according to claim 2, wherein the lock member is arranged in a pair to sandwich the driven side rotation body in the radial direction, and the pair of lock members are movable in opposite directions along the radial direction of the drive shaft.

5. The clutch according to claim 2, further comprising a support member that supports the lock member to be movable in the radial direction of the drive shaft and rotates integrally with the drive side rotation body and the driven side rotation body by means of the lock member.

6. The clutch according to claim 2, wherein
the lock member includes a driven side cam surface facing the camshaft in the radial direction at a side surface opposite to the contact portion; and
during non-rotation of the drive side rotation body, when the driven side rotation body rotates, the cam shaft pushes the driven side cam surface and moves the lock member outward in the radial direction.

7. The clutch according to claim 2, wherein the drive side rotation body and the driven side rotation body include transmission surfaces that contact each other in the rotation direction of the drive side rotation body during rotation of the drive side rotation body.

8. The clutch according to claim 2, wherein during non-rotation of the drive side rotation body, the lock member is held by the driven side rotation body and the inner circumferential surface of the clutch housing, and rotation of the driven side rotation body relative to the lock member is allowed in a state in which a desired frictional force is generated between the contact portion and the inner circumferential surface of the clutch housing.

9. The clutch according to claim 1, wherein the lock member is arranged in a pair to sandwich the driven side rotation body in the radial direction, and the pair of lock members are movable in opposite directions along the radial direction of the drive shaft.

10. The clutch according to claim 1, further comprising a support member that supports the lock member to be movable in the radial direction of the drive shaft and rotates integrally with the drive side rotation body and the driven side rotation body by means of the lock member.

11. The clutch according to claim 10, wherein
the drive side rotation body includes a pair of drive transmission portions extending in an axial direction of the drive shaft and facing each other in the radial direction of the drive shaft, and the pair of drive transmission portions are configured to push the drive side cam surface in the rotation direction of the drive side rotation body as the drive side rotation body rotates; and
the support member is arranged between the pair of drive transmission portions and includes a restriction portion that restricts spreading of the drive transmission portions outward in the radial direction.

12. The clutch according to claim 10, wherein at least one of the drive side rotation body and the support member includes an engagement portion that integrally engages the drive side rotation body and the support member with each other in the axial direction.

13. The clutch according to claim 1, wherein
the lock member includes a driven side cam surface facing the camshaft in the radial direction at a side surface opposite to the contact portion; and
during non-rotation of the drive side rotation body, when the driven side rotation body rotates, the cam shaft pushes the driven side cam surface and moves the lock member outward in the radial direction.

14. The clutch according to claim 13, wherein
the lock member is arranged in a pair to sandwich the camshaft, and the pair of lock members is movable in opposite directions along the radial direction of the drive shaft; and
during rotation of the drive side rotation body, the pair of lock members moved inward in the radial direction holds the camshaft with the driven side cam surfaces of the pair of lock members and transmit rotational drive force from the drive side rotation body to the driven side rotation body through the lock members.

15. The clutch according to claim 13, wherein the camshaft is rod-shaped.

16. The clutch according to claim 15, wherein the driven side cam surface has a shape as viewed from an axial direction that is arcuate so that the camshaft can be held from two sides surfaces in a minor axis direction of the camshaft.

17. The clutch according to claim 1, wherein the drive side rotation body and the driven side rotation body include transmission surfaces that contact each other in the rotation direction of the drive side rotation body during rotation of the drive side rotation body.

18. The clutch according to claim 1, wherein during non-rotation of the drive side rotation body, the lock member is held by the driven side rotation body and the inner circumferential surface of the clutch housing, and rotation of the driven side rotation body relative to the lock member is allowed in a state in which a desired frictional force is generated between the contact portion and the inner circumferential surface of the clutch housing.

19. A motor comprising:
    a motor unit including a drive shaft;
    a deceleration unit including a driven shaft, which is arranged coaxially with the drive shaft and to which rotational drive force of the drive shaft is transmitted, the deceleration unit decelerates and outputs the rotational drive force transmitted to the driven shaft; and
    a clutch arranged between the drive shaft and the driven shaft, the clutch including:
    a drive side rotation body integrally rotatable with the drive shaft;
    the driven shaft arranged coaxially with the drive shaft;
    a driven side rotation body integrally rotatable with the driven shaft;
    a clutch housing in which the drive side rotation body and the driven side rotation body can be arranged; and
    a lock member arranged between the drive side rotation body and the driven side rotation body inside the clutch housing, wherein the lock member includes a contact portion, which contacts with and separates from an inner circumferential surface of the clutch housing, and a drive side cam surface with which the drive side rotation body comes into contact from a rotation direction,
    wherein
    the drive side cam surface includes a part of an outer peripheral surface of the lock member,
    the driven side rotation body includes a camshaft having an elliptical cross-section,
    the elliptical cross-section includes a major axis and a minor axis, the major axis being longer than the minor axis,
    during non-rotation of the drive side rotation body, when the driven side rotation body is rotated, the lock member is pushed by the driven side rotation body and moved outward in a radial direction thereby bringing the contact portion into contact with the inner circumferential surface of the clutch housing such that the lock member is sandwiched between the clutch housing and the driven side rotation body and inhibits further rotation of the driven side rotation body, and
    during rotation of the drive side rotation body, the drive side rotation body pushes the drive side cam surface in the rotation direction, and the drive side cam surface acts to move the lock member inward in the radial direction and push the lock member against the driven side rotation body so that the lock member is sandwiched between the drive side rotation body and the driven side rotation body thereby coupling the drive side rotation body and the driven side rotation body with the lock member to be integrally rotatable.

20. The motor according to claim 19, wherein
    the deceleration unit includes the driven shaft, a worm wheel, and an output shaft, wherein the driven shaft is arranged to be integrally rotatable with the driven side rotation body, supported by a bearing in a rotatable manner, and includes a screw teeth portion, the worm wheel is engaged with the screw teeth portion, and the output shaft is drive coupled to the worm wheel; and
    during non-rotation of the drive shaft, the lock member is held by the driven side rotation body and the inner circumferential surface of the clutch housing, the rotation of the driven side rotation body is allowed in a state in which a desired frictional force is generated between the contact portion and the inner circumferential surface of the clutch housing, and transmission of the rotational force from the output shaft to the drive shaft is inhibited by at least an engagement load of the worm wheel and the screw teeth portion, a friction load of the driven shaft and the bearing, and a rotation load of the clutch.

* * * * *